(12) United States Patent
Baldwin et al.

(10) Patent No.: US 10,949,941 B2
(45) Date of Patent: *Mar. 16, 2021

(54) METHOD AND SYSTEM FOR CONTROLLING DISTRIBUTION OF COMPOSITE DATA OF USER BY AGGREGATION SERVER

(71) Applicant: AT&T INTELLECTUAL PROPERTY I, L.P., Atlanta, GA (US)

(72) Inventors: Christopher F. Baldwin, Algonquin, IL (US); Bruce Barnes, Pingree Grove, IL (US); Dolores J. Mallian, St. Charles, IL (US); Charles Stahulak, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 338 days.

This patent is subject to a terminal disclaimer.

(21) Appl. No.: 15/922,558

(22) Filed: Mar. 15, 2018

(65) Prior Publication Data
US 2018/0204299 A1    Jul. 19, 2018

Related U.S. Application Data

(63) Continuation of application No. 14/082,116, filed on Nov. 16, 2013, now Pat. No. 9,953,386.

(51) Int. Cl.
*G06Q 10/10* (2012.01)
*G06Q 30/02* (2012.01)
(Continued)

(52) U.S. Cl.
CPC .......... *G06Q 50/265* (2013.01); *G06F 16/13* (2019.01); *G06F 16/3331* (2019.01);
(Continued)

(58) Field of Classification Search
CPC ...... G06Q 50/01; G06Q 50/265; G06F 16/13; G06F 16/51; G06F 16/3331; H04L 65/403
(Continued)

(56) References Cited

U.S. PATENT DOCUMENTS 6,571,279 B1    5/2003    Herz et al.
7,337,172 B2    2/2008    Shapiro et al.
(Continued)

FOREIGN PATENT DOCUMENTS

WO    2010/090336 A1    8/2010
WO    2011/083337 A1    7/2011
(Continued)

OTHER PUBLICATIONS

Natasha Singer, "A Data Broker Offers a Peek Behind the Curtain", New York Times, Business Day, Published: Aug. 31, 2013.
(Continued)

*Primary Examiner* — Jonathan P Ouellette
(74) *Attorney, Agent, or Firm* — Amin, Turocy & Watson, LLP

(57) ABSTRACT

A method is provided for controlling the distribution of composite data of a user by an aggregation server. The method includes receiving data relating to the user that is generated from a plurality of sources, including image data, that is transmitted over a communication network. The method also includes identifying an image of the user captured in the image data using one or more of facial recognition, user names, and device identifiers. The method includes matching the identified image of the user with a profile of the user, and sending a notification to an address associated with the user informing the user of the image captured in the image data. The method further includes receiving a sharing permission from the user to share a
(Continued)

designated portion of the data with an approved entity, and sharing the designated portion of the data with the approved entity.

20 Claims, 24 Drawing Sheets

(51) Int. Cl.
| | |
|---|---|
| *G06Q 10/08* | (2012.01) |
| *G06Q 40/08* | (2012.01) |
| *G06Q 50/26* | (2012.01) |
| *H04L 29/06* | (2006.01) |
| *G06Q 50/00* | (2012.01) |
| *G06F 16/13* | (2019.01) |
| *G06F 16/51* | (2019.01) |
| *G06F 16/33* | (2019.01) |

(52) U.S. Cl.
CPC ............ *G06F 16/51* (2019.01); *G06Q 50/01* (2013.01); *H04L 65/403* (2013.01)

(58) Field of Classification Search
USPC .................................. 705/1.1–912, 319, 325
See application file for complete search history.

(56) References Cited

U.S. PATENT DOCUMENTS

| | | | |
|---|---|---|---|
| 7,925,743 | B2 | 4/2011 | Neely et al. |
| 8,448,258 | B2 | 5/2013 | Abuelsaad et al. |
| 8,463,765 | B2 | 6/2013 | Lesavich et al. |
| 8,489,511 | B2 | 7/2013 | Coleman et al. |
| 8,521,655 | B2 | 8/2013 | Carter et al. |
| 8,521,778 | B2 | 8/2013 | James et al. |
| 8,532,108 | B2 | 9/2013 | Li |
| 2002/0080198 | A1 | 6/2002 | Giraldin et al. |
| 2002/0124253 | A1 | 9/2002 | Eyer et al. |
| 2003/0154212 | A1 | 8/2003 | Schirmer et al. |
| 2007/0156594 | A1 | 7/2007 | McGucken et al. |
| 2009/0153654 | A1 | 6/2009 | Enge et al. |
| 2009/0172035 | A1 | 7/2009 | Lessing et al. |
| 2009/0254971 | A1 | 10/2009 | Herz et al. |
| 2011/0022681 | A1 | 1/2011 | Simeonov et al. |
| 2012/0105632 | A1 | 5/2012 | Renkis et al. |
| 2012/0131009 | A1 | 5/2012 | Nath et al. |
| 2012/0173628 | A1 | 7/2012 | Briere et al. |
| 2012/0258681 | A1 | 10/2012 | Hanover |
| 2013/0201329 | A1 | 1/2013 | Thornton et al. |
| 2013/0036117 | A1 | 2/2013 | Fisher et al. |
| 2013/0093898 | A1 | 4/2013 | Tink et al. |
| 2013/0166711 | A1 | 6/2013 | Wang et al. |
| 2013/0185336 | A1 | 7/2013 | Singh et al. |
| 2013/0218911 | A1 | 8/2013 | Li et al. |
| 2014/0214895 | A1 | 7/2014 | Higgins et al. |
| 2015/0088603 | A1 | 3/2015 | Romero et al. |

FOREIGN PATENT DOCUMENTS

| | | |
|---|---|---|
| WO | 2013/009721 A1 | 1/2013 |
| WO | 2013/120113 A1 | 8/2013 |

OTHER PUBLICATIONS

Hansen, Marit, "Marrying transparency tools with user-controlled identity management", The Future of Identity in the Information Society, Springer, US, 2008, pp. 199-220.

Hansen, Marit, "User-controlled identity management: the key to the future of privacy?", International Journal of Intellectual Property Management 2.4 (2008): pp. 325-344.

Non-Final Office Action received for U.S. Appl. No. 14/082,116 dated Dec. 14, 2016, 15 pages.

Final Office Action received for U.S. Appl. No. 14/082,116 dated Mar. 31, 2017, 14 pages.

METHOD AND SYSTEM FOR CONTROLLING DISTRIBUTION OF COMPOSITE DATA OF USER BY AGGREGATION SERVER

CROSS-REFERENCE TO RELATED APPLICATION

This is a continuation application of, and claims priority to, U.S. patent application Ser. No. 14/082,116 (now U.S. Pat. No. 9,953,386), filed Nov. 16, 2013, the disclosures of which application, including the specifications, drawings and claims, are incorporated herein by reference in their entireties.

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Data monitoring is a fact of modern life. Our electronic, online data is profiled. We have recently learned our locations and communications are being monitored. These revelations have shaken our confidence and destroyed our trust.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise, it will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
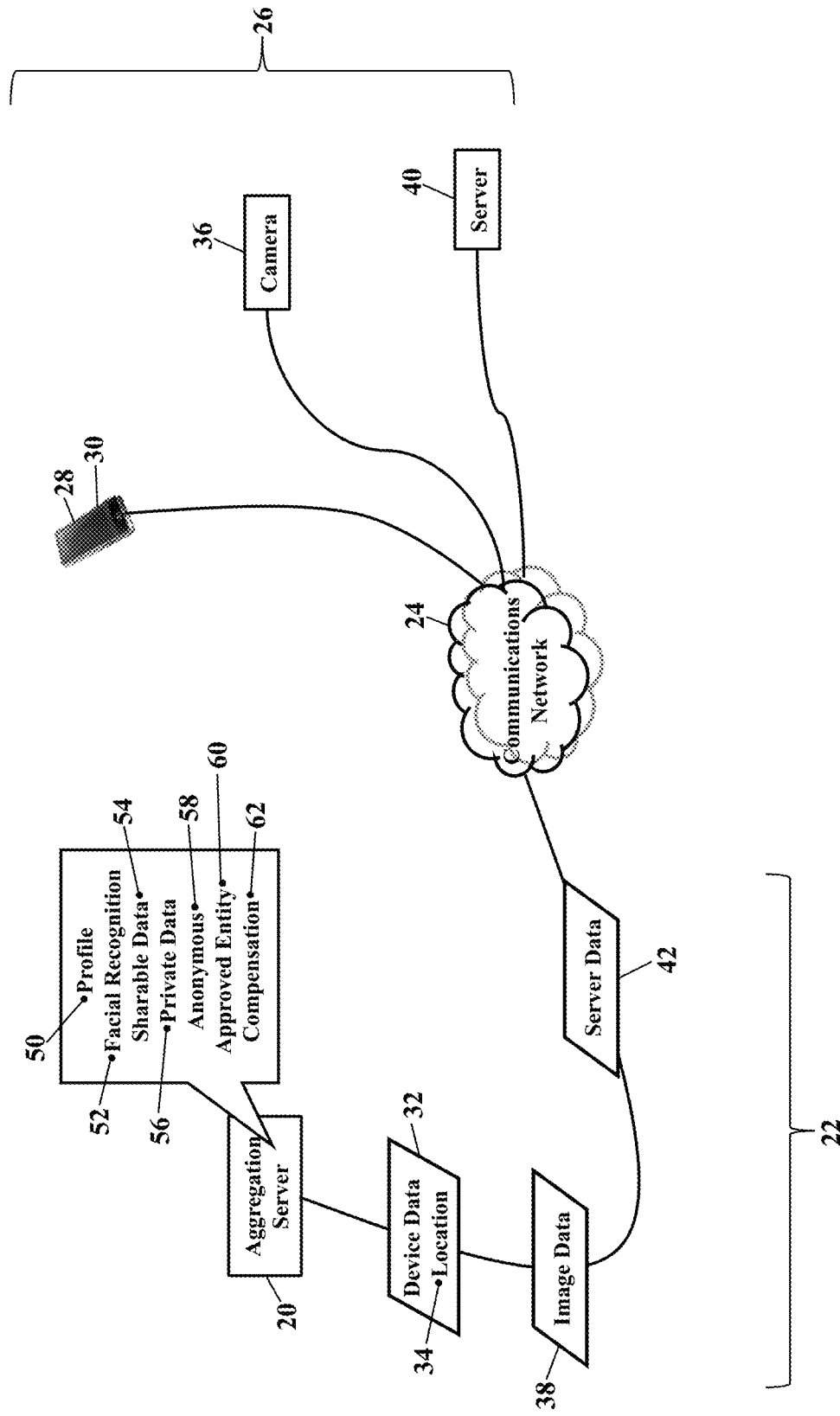
FIGS. 1-2 are simplified schematics illustrating an environment in which exemplary embodiments may be implemented.
Figure 2:
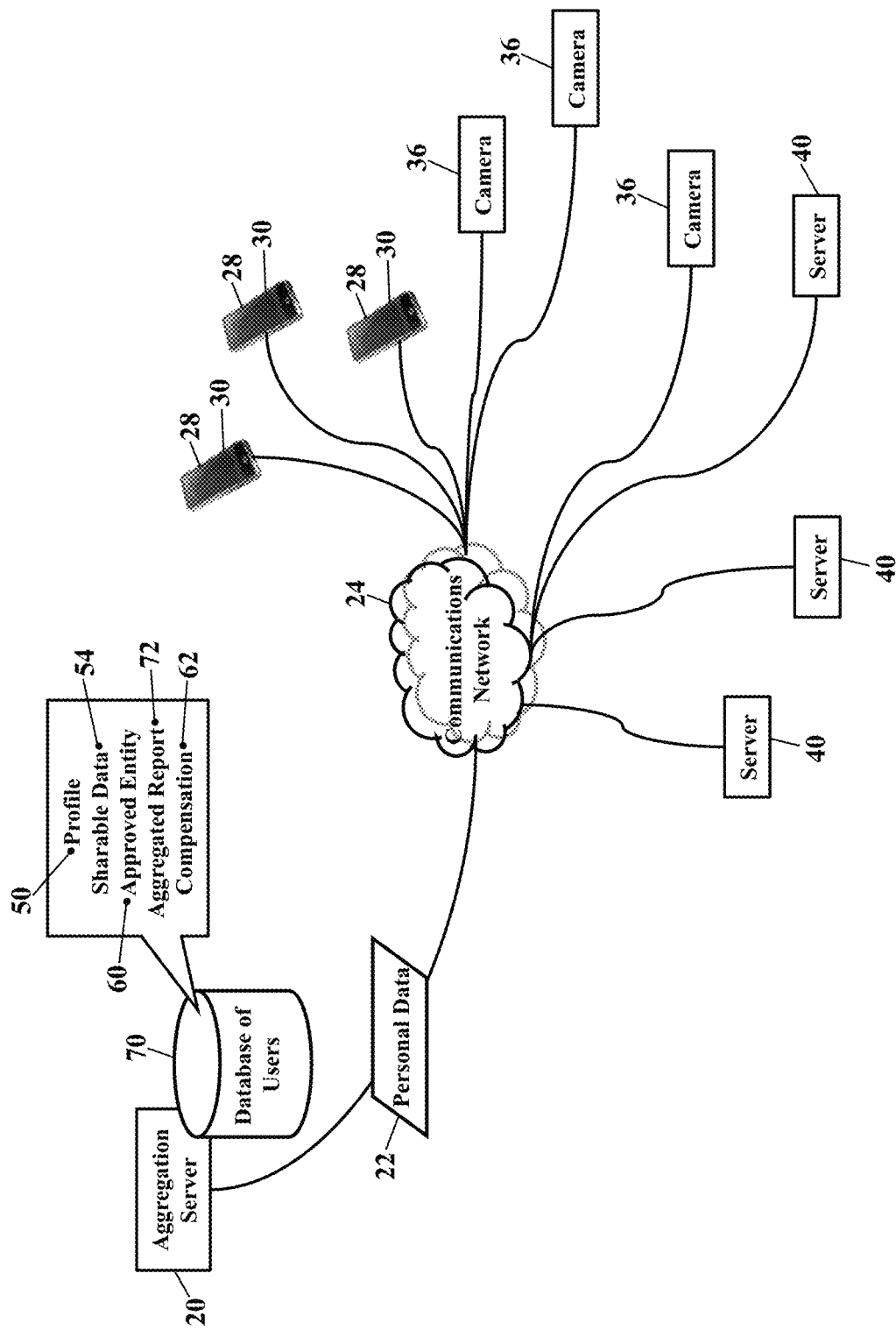
Figure 3:
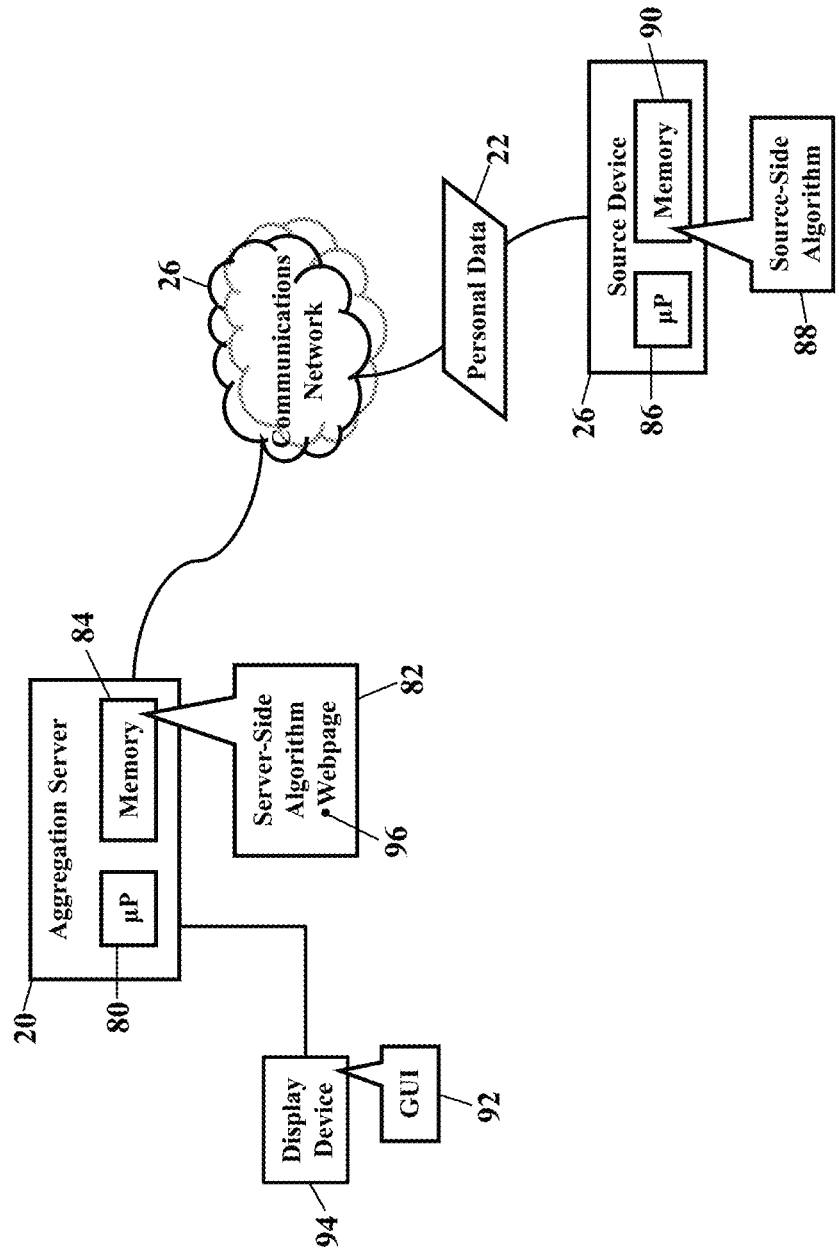
FIGS. 3-6 are more detailed schematics illustrating the operating environment, according to exemplary embodiments.

FIGS. 1-2 are simplified schematics illustrating an environment in which exemplary embodiments may be implemented. FIG. 1 illustrates an aggregation server 20 that receives notification of all kinds of personal data 22 routed along a communications network 24. The personal data 22 is generated by various source devices 26. While there may be many source devices 26, FIG. 1, for simplicity, only illustrates a few. For example, a mobile device 28 (such as a smartphone 30) generates and sends device data 32 (such as its location 34), which may be routed or forwarded along the communications network 24 to the aggregation server 20. A digital camera 36 generates image data 38 (such as video or still images), which may also be routed or forwarded to the aggregation server 20. A server 40 generates server data 42 (such website requests, social networking information, and other online data), which may also be routed or forwarded to the aggregation server 20. Indeed, as has been revealed, there may be hundreds of public and private video cameras 36 capturing our daily movements and habits. Our mobile devices 28 reveal our travels and our communications. Our online activity (via transactions with the server 40) is being tracked. The aggregation server 20 may aggregate all this personal data 22 for analysis and publication, as this disclosure will explain.

Whatever the source device 26, the aggregation server 22 is notified of the personal data 22. FIG. 1, for simplicity, illustrates all the personal data 22 being forwarded to the aggregation server 20 for indexing and/or analysis. Alternatively, the aggregation server 20 may only be informed of the personal data 22, such that the aggregation server 20 need not be burdened with collection and storage. Regardless, when the aggregation server 20 receives the personal data 22, the aggregation server 20 matches the personal data 22 with a profile 50 of a user. That is, the aggregation server 20 analyzes the personal data 22 to identify the user or users described by, or shown in, the personal data 22. The aggregation server 20, for example, may associate the device data 32 to the user/owner of the mobile device 28. The aggregation server 20 may use facial recognition 52 to identify the user in the image data 38. Usernames and device identifiers may be used to identify the user in the server data 42. The aggregation server 20 thus indexes the user to all the personal data 22 collected about her.

Once the user is indexed, the aggregation server 20 passes control to the user. The aggregation server 20 makes the personal data 22 available to the corresponding user. The user, in other words, may review the personal data 22 collected about her and decide how her own personal data 22 is shared. The user may thus decide which of her personal data 22 is sharable as sharable data 54, and which of the data 22 is maintained as private data 56 and unavailable. Indeed, the user may even delete the private data 56 she does not want revealed. Even if the user approves the sharable data 54, the user may request that the sharable data 54 be rendered anonymous 58. Once the user has specified her sharable data 54, the user may even specify approved entities 60 that may access and use the sharable data 54. The user, for example, may specify or approve the retailers having access to her sharable data 54. Likewise, the user may deny access permissions to specific entities. The user thus has complete sharing control over how her personal data 22 is used for profiling, marketing, and advertising purposes.

Exemplary embodiments thus describe a market exchange. The aggregation server 20 thus presents a central, network-centric location at which all the user's personal data 22 is indexed for collection and/or storage. The user decides which of her personal data 22 is revealed and to whom her sharable data 54 is revealed. Any of the approved entities 60 may then access the user's sharable data 54 for marketing, profiling, and other uses. The user thus knows who is obtaining her personal data 22, and she can receive compensation 62 in exchange for revealing her personal data 22. Exemplary embodiments may even compensate providers of the data 22, such as the business owners where the security cameras 36 are installed.

Exemplary embodiments return control to the user. Data collection and profiling are a fact of life in our modern world. While many people may not object to collection of at least some of the data 22, most people strongly object to a perceived lack of transparency around what has been generated/obtained and by whom. Exemplary embodiments, instead, let users participate in the collection of their personal data 22. Users determine what personal data 22 is shared and with whom. Even though surveillance may be necessary, exemplary embodiments return control and comfort to data collection. Indeed, users are more likely to frequent the retailers and other approved entities 60 that transparently contribute to the individual's personal data 22. The user's sharable data 54 also improves contextual computing efforts, thus further enhancing the relationship between the user and the retailer. Retailers, in other words, benefit by better customizing advertisements and shopping/service experiences. Exemplary embodiments thus create a win-win benefit between willing users and transparent retailers.

FIG. 2 illustrates more aggregation. Here the aggregation server 20 may catalogue the personal data 22 associated with many different users. The aggregation server 20 stores a database 70 of users, which tracks which portions of each user's personal data 22 are revealed to whom. Each individual user, in other words, may determine their sharable data 54 that is revealed to their respective approved entities 60. When any approved retailer queries the aggregation server 20, the retailer may thus retrieve an aggregated, summary report 72 of all the different users giving permission for that retailer to access their individual sharable data 54. An individual's sharable data 54, in other words, may be combined and sold with other users giving the same access. Each member of the group may thus receive the compensation 62 from the retailer for the access.

A market may thus develop. The personal data 22 is collected by online services and systems, as well as by brick and mortar establishments. In today's world, all this personal data 22 is used and sold with little or no knowledge. Exemplary embodiments, instead, create a market where the user's approved, sharable data 54 may be combined and sold with the user's knowledge. As information from multiple users is likely more valuable than a single user's personal data 22, exemplary embodiments may combine, profile, and/or organize multiple users' sharable data 54 so as to refer to a population or group having similar characteristics. Exemplary embodiments thus establish a platform in which all parties benefit from transparent participation. As more and more users will prefer transparent participation, exemplary embodiments will drive participation from more and more third parties. The amount of the personal data 22 for analysis will thus maximize benefits for data contributors, users, merchants, and marketers.

Exemplary embodiments improve relations with patrons. Exemplary embodiments create transparency in the use of personal data. Patrons know what data is being collected and shared with the trusted, approved entities 60. Profiling schemes are thus more trusted, without suspicions of invasive privacy or of sneaky, manipulative tactics. Patrons, instead, see added value in an approved entity's profiling actions, and the merchants incur little or no extra costs. As the personal data 22 is primarily captured in the real, physical world, brick and mortar merchants will experience increased foot traffic for more sales. The brick and mortar merchants, in other words, may better compete against online merchants. Moreover, as the users receive the compensation 62 for participating, exemplary embodiments forge stronger membership and loyalty ties. As later paragraphs will explain, exemplary embodiments may also notify users when their sharable data 54 is accessed, thus adding new or enhanced functionality to the shopping/service experience. The user's sharable data 54 is used, in short, with permission and with full knowledge. Monitoring is happening, so exemplary embodiments offer control over the surveillance.

The compensation 62 may include providers of the data 22. As this disclosure explained, the security cameras 36 provide the image data 38 of public and private places. Exemplary embodiments may offer some portion of the compensation 62, or a separate compensation 62 altogether, to the small business owners who install and operate the security cameras 36. Similarly, big-box retailers may also receive the compensation 62 for contributing the image data 38 from their security cameras 36. Even municipalities may receive the compensation 62 for contributing the image data 38 from their security cameras 36. All participating entities, in other words, may receive at least a portion of the compensation 62 for supplying the image data 38. The compensation 62 may be further based on frequency of access to the sharable data 54, who accesses the sharable data 54, the location or type of the sharable data 54, and/or the amount of the data 22 provided.

FIGS. 3-6 are more detailed schematics illustrating the operating environment, according to exemplary embodiments. The aggregation server 20 may have a processor 80 (e.g., "µP"), application specific integrated circuit (ASIC), or other component that executes a server-side algorithm 82 stored in a local memory 84. Each source device 26 may also have a processor 86 (e.g., "µP"), application specific integrated circuit (ASIC), or other component that executes a source-side algorithm 88 stored in a local memory 90. Whatever the source device 26, each source device 26 may send, or notify of, its respective personal data 22 to the network address of the aggregation server 20. The server-side algorithm 82 may cause the processor 80 to generate a user interface (or "GUI") 92 for configuring the user's personal data 22. The interface 92 may be graphical and presented on a display device 94. The interface 92, though, may be a webpage 96 that is requested and delivered to any destination (such as the user's smartphone 30 illustrated in FIGS. 1-2).

Figure 4:
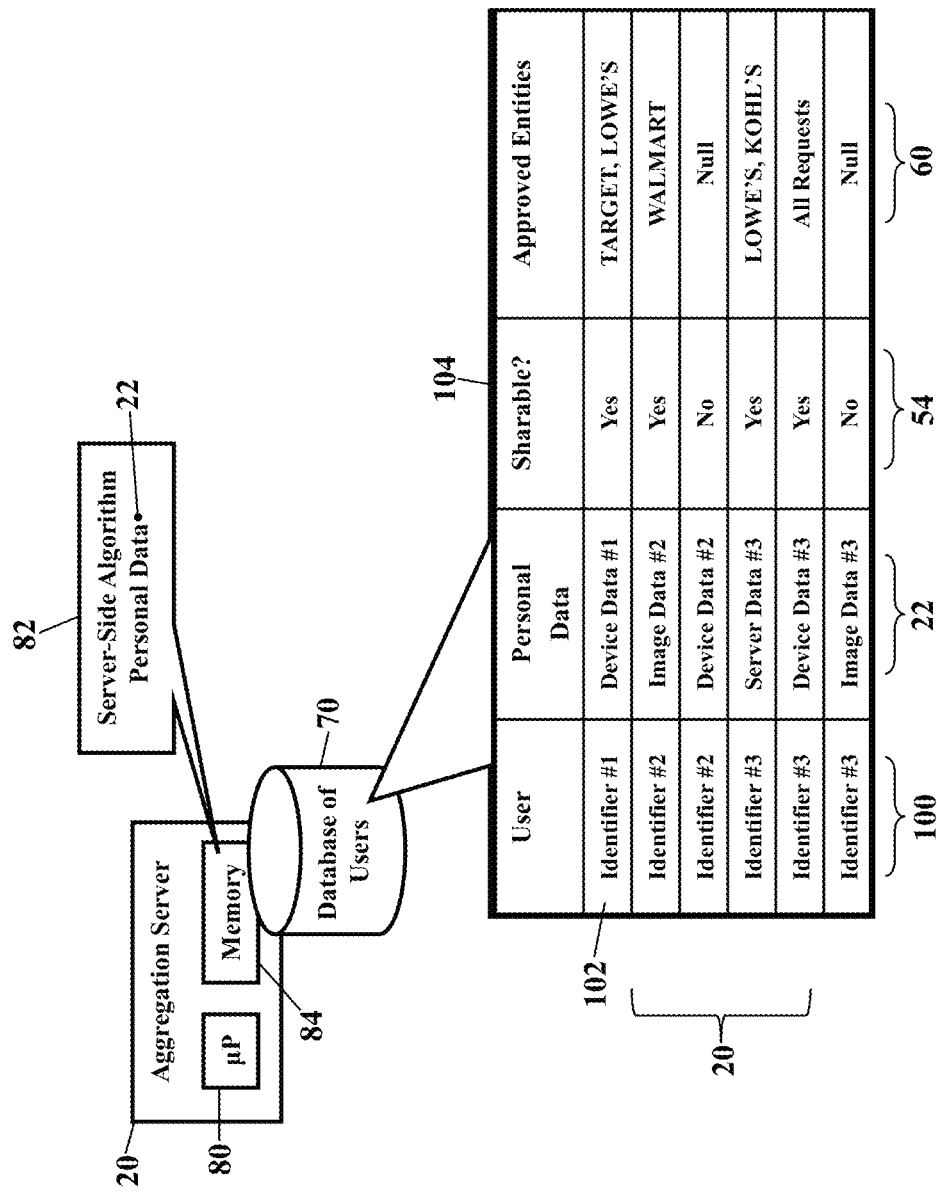

As FIG. 4 illustrates, the user's personal data 22 may be indexed. When the aggregation server 20 receives the personal data 22, the server-side algorithm 82 instructs the processor 80 to match the personal data 22 with one of the users 100 in the database 70 of users. Each user is uniquely identified with a user identifier 102. The database 70 of users is illustrated as a table 102 that maps, relates, or associates the different users 100 to the corresponding user's personal data 22, their sharable data 54, and their approved entities 60 that may access the sharable data 54. Each entry in the database 70 of users may thus be populated with raw data, network addresses, or pointers to which any portion of the user's personal data 22 may be retrieved for sharing. The database 70 of users may thus be a central repository or mapping of all the user's personal data 22 generated by any of the source devices (illustrated as reference numeral 26 in FIGS. 1-3)

Figure 5:
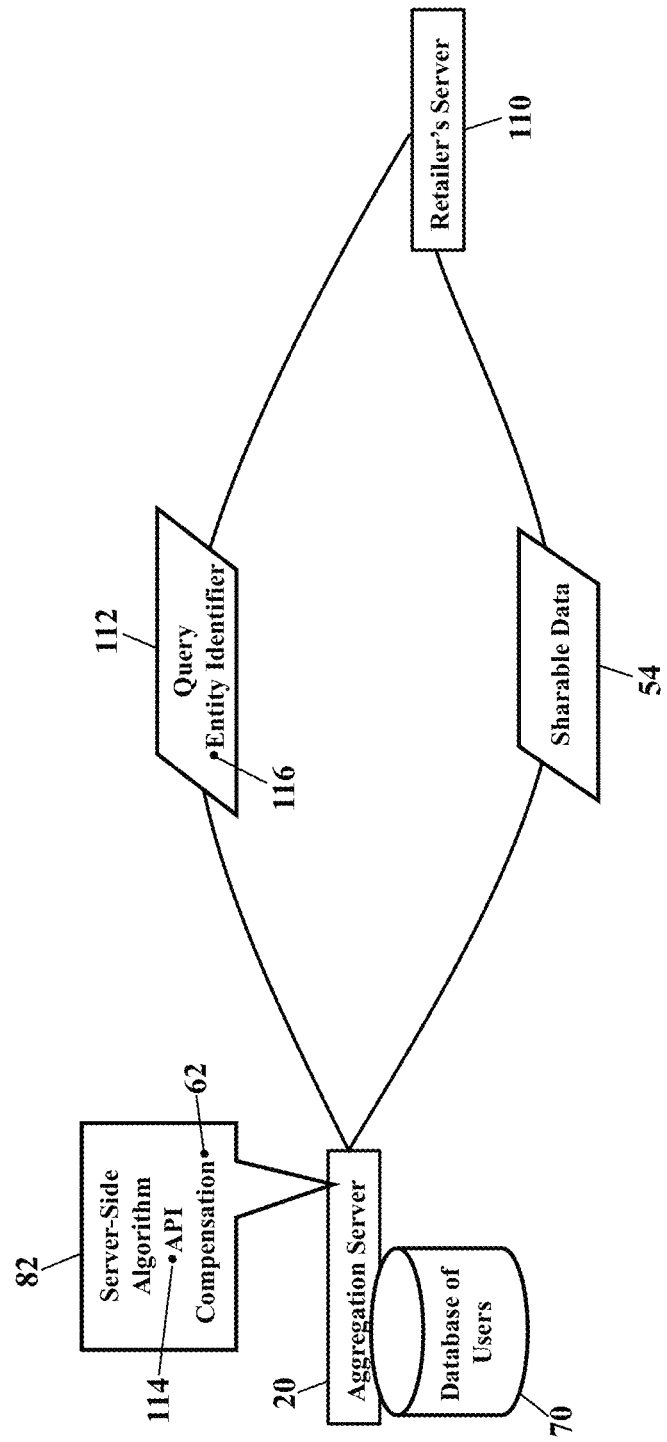

As FIG. 5 illustrates, third parties may query the aggregation server 20. Suppose a retailer wants access to the user's sharable data 54 for marketing or advertising purposes. The retailer's server 110, for example, sends a query 112 to the network address of the aggregation server 20. The query 112 may utilize standardized commands or calls from a set of application programming interfaces (or "APIs") 114. The query 112 includes one or more query parameters, such as an entity identifier 116 that uniquely identifies the party requesting access to the database 70 of users. When the aggregation server 20 receives the query 112, the server-side algorithm 82 may query the database 70 of users for the entity identifier 116. If the entity identifier 116 matches any entries in the database 70 of users (as illustrated with reference to FIG. 4), the server-side algorithm 142 retrieves the corresponding sharable data 54. The server-side algorithm 82 then causes the aggregation server 20 to send the sharable data 54 as a response to the query 112. The server-side algorithm 142 may then process or authorize the compensation 62 to the user.

The requestor must be authorized. As this disclosure explains, only the user's approved entities 60 may have access to the user's sharable data 54. If the entity identifier 116 does not match one of the user's approved entities 60, then the query 112 may be denied. The user, for example, may specify those retailers for which access is granted. The application programming interfaces 114 may thus include a standardized, universally recognized alphanumeric code that is assigned to each one of the approved entities 60. If the entity identifier 116 does not match one of the approved entities 60, then the user's sharable data 54 may not be revealed. The entity identifier 116, however, may be far more elaborate to ensure nefarious access is prevented.

Figure 6:
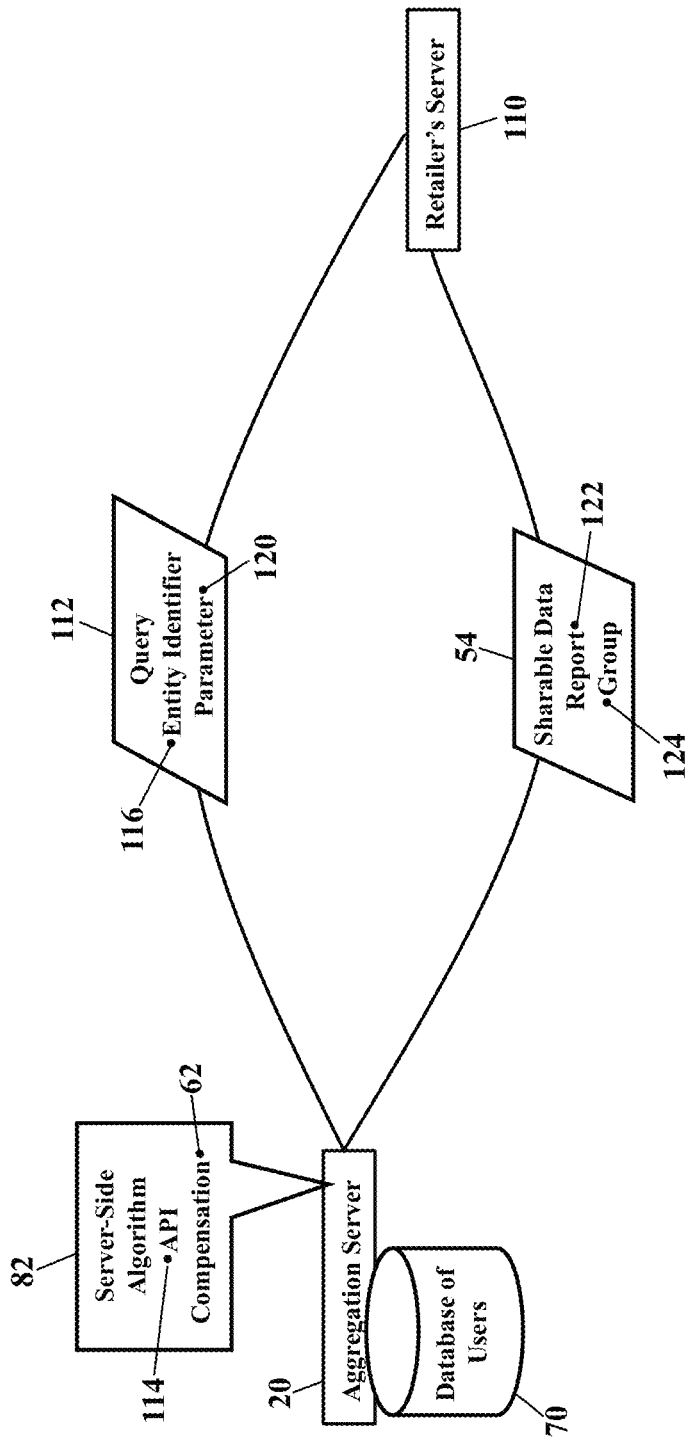

FIG. 6 illustrates populations of the sharable data 54. As the reader may envision, many people may permit the same retailer to access their respective sharable data 54. Millions of people, for example, may list TARGET® as one of their approved entities 60. So, when the aggregation server 20 receives the query 112 specifying TARGET® as the entity identifier 116, the server-side algorithm 82 may retrieve thousands, or even millions, of matching entries. In practice, then, the query 112 will also include more query parameters 120, such as location, time, income, or other demographic indicator. Whatever the query parameters 120, the application programming interfaces 114 may further include standardized, universally recognized terms for many different query parameters 120. Moreover, the application programming interfaces 114 may further include standardized terms for summary reports 122 and other outputs that combine the sharable data 54 for groups 124 of many different users. The server-side algorithm 82 instructs the aggregation server 20 to retrieve the matching shamble data 54 and generate the report 122 in response to the query 112. The server-side algorithm 142 may then process or authorize the compensation 62 to the group 124 of users matching the query parameters 116 and 120.

Exemplary embodiments may utilize any processing component, configuration, or system. Any of the processors could be multiple processors, which could include distributed processors or parallel processors in a single machine or multiple machines. Any of the processors can be used in supporting a virtual processing environment. Any of the processors could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Exemplary embodiments may be applied regardless of networking environment. As the above paragraphs mentioned, the communications network 24 may be a wireless network having cellular, WI-FI®, and/or BLUETOOTH® capability. The communications network 24, however, may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the IEEE 802 family of standards, GSM/CDMA/TDMA or any cellular standard, and/or the ISM band), The communications network 24 may even include power line portions, in which signals are communicated via electrical wiring. The concepts described herein may be applied to any wireless/wireline communications network, regardless of physical componentry, physical configuration, or communications standard(s).

Figure 7:
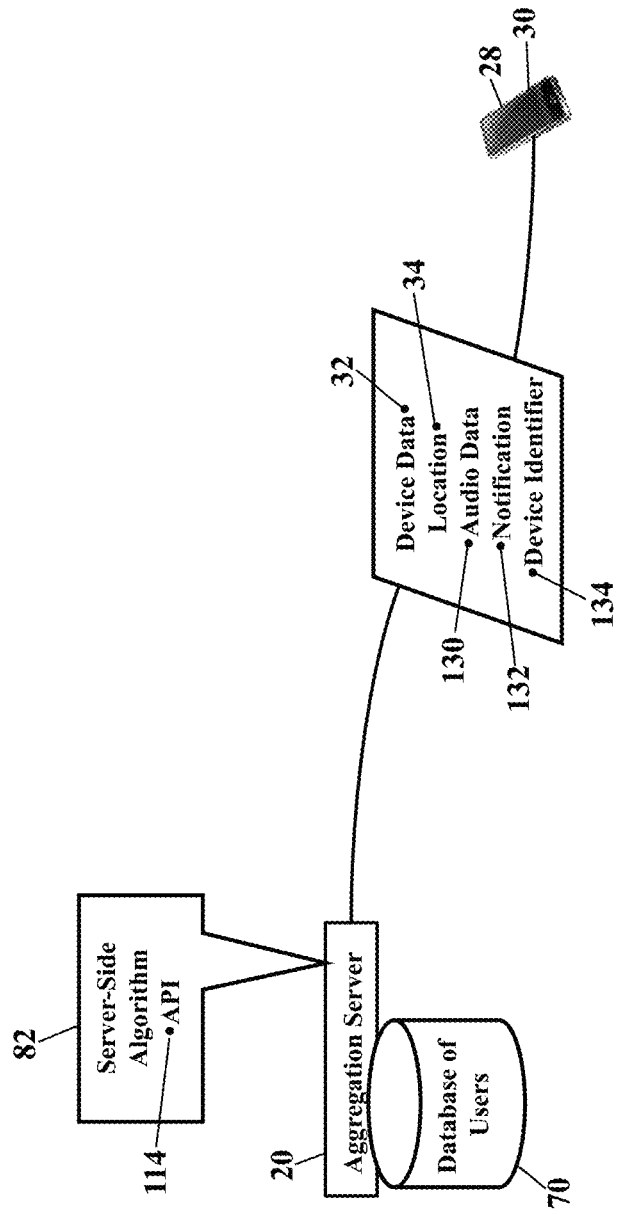
FIGS. 7-8 are diagrams illustrating source devices, according to exemplary embodiments.
Figure 8:
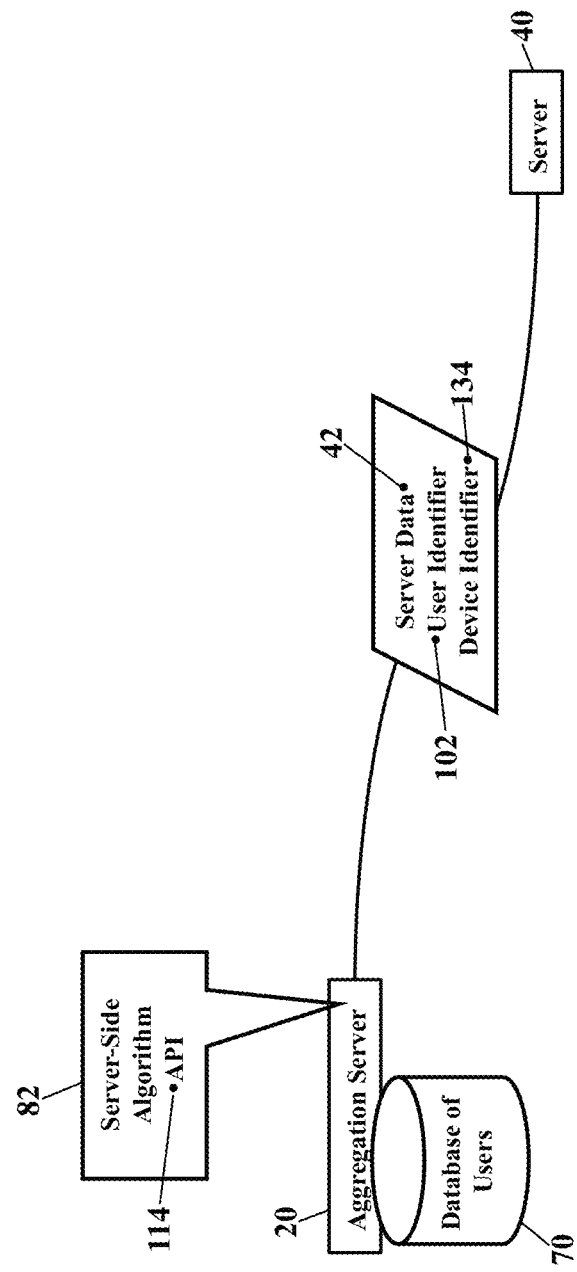

FIGS. 7-8 are diagrams illustrating the source devices 26, according to exemplary embodiments. The user's mobile device 28 (such as her smartphone 30) generates its device data 32. Many mobile devices 28, for example, generate their location 34 as global positioning system information. The location 34, however, may be determined using other techniques. The user's mobile device 28 may also use its camera to capture images and video, while its microphone may capture audio data 130. Some mobile devices 28 may even capture and record health information, such as heart rates. Should the mobile device 28 be a vehicle, the vehicle has many sensors that capture the device data 32 (such as travel locations, destinations, music and other entertainment selections, diagnostic information, and HVAC settings), Whatever the mobile device 28, and whatever its sensory capabilities, the mobile device 28 may send its device data 32 to the network address of the aggregation server 20. The device data 32 may use common terms, definitions, and value ranges from the application programming interfaces 114. Even if the device data 32 is not centrally collected at the aggregation server 20, the mobile device 28 may still send a report or notification 132 to the aggregation server 20 that the device data 32 was generated. When the aggregation server 20 receives the device data 32, or notification 132 thereof, the aggregation server 20 allows the user to manage the use of the device data 32. The device data 32 may be associated with a device identifier 134 of the mobile device 28 (such as an IP address, telephone number, serial number, or other unique identifier). The aggregation server 20 may thus identify the user by the device identifier 134 of the mobile device 28. The device data 32 may thus be associated to the corresponding user in the database 70 of users.

FIG. 8 illustrates the server data 42. The server data 42 is generated by the server 40, which may be a component of any service or process. The server 40, for example, may be a website server that tracks websites and other online browsing behaviors. The server 40, however, may also monitor and/or conduct e-commerce transactions involving purchases and/or credit card numbers. The server 40 may monitor content selections for movies, games, and other online streaming content (such as NETFLIX® selections). The server 40 may also monitor social networking sites (such as FACEBOOK® and TWITTER® postings). The server data 42 may thus describe any request, query, or transaction processed by, or observed by, the server 40. The server data 42 may use common terms, definitions, and value ranges from the application programming interfaces 114. Whatever the server data 42 describes, the server data 42 may also be associated with the user identifier 102 and/or the device identifier 134, which identifies the corresponding user. The server data 42, however, may also include or be associated with account numbers, usernames, passwords, or any other information that identifies the user. When the aggregation server 20 receives the server data 42, the aggregation server 20 may thus index the server data 42 to the corresponding user identifier 102 in the database 70 of users.

Permissions may even be device level. Even though there may be many source devices 26 reporting the user's data 22, the user may choose which of those source devices 26 is permitted to share. That is, the user may strike some of the source devices 26 as unavailable for sharing. Any personal data 22, generated by an unpermitted source device 26, may thus be excluded from sharing and analysis. As a simple example, the user may simply not want any device data 32 from her personal smartphone 30 used for sharing purposes. For whatever reason, she may select an option that instructs the aggregation server 20 to never permit access to the device data 32 from her personal smartphone 30. She may similarly feel her FACEBOOK® posts are too personal, so the corresponding server data 42 is excluded from transparent sharing. The user may even configure the aggregation server 20 to exclude certain personal data 22 for periods or durations of time. Exemplary embodiments thus permit global exclusion of source devices 26, and/or time-based exclusion, depending on the user's needs.

Figure 9:
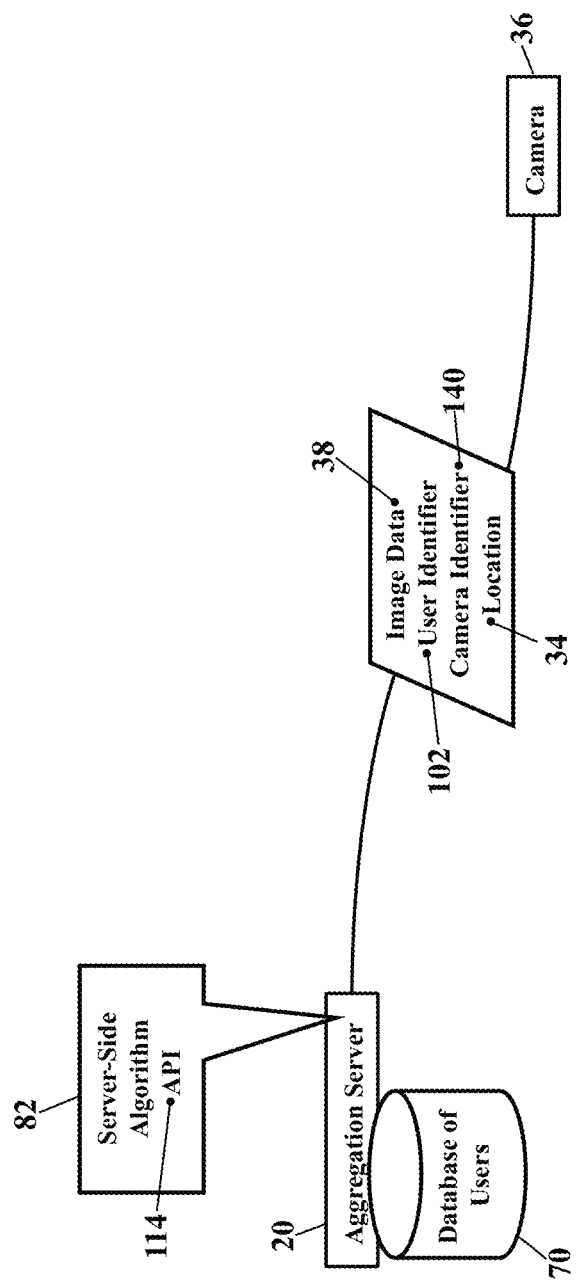
FIGS. 9-10 are diagrams illustrating the image data 38, according to exemplary embodiments.
Figure 10:
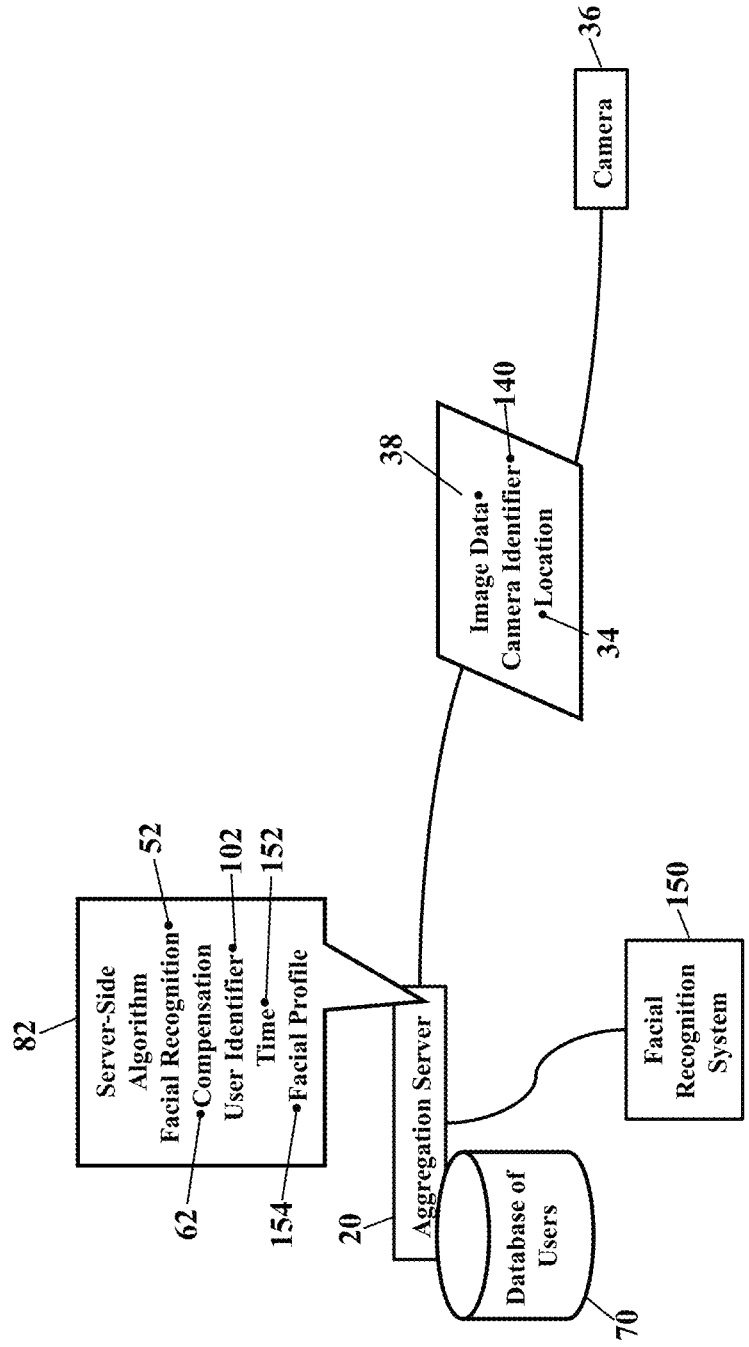

FIGS. 9-10 are diagrams illustrating the image data 38, according to exemplary embodiments. The image data 38 is generated by the digital camera 36, which may be located in any public or private space. Many brick and mortar establishments, for example, have security cameras 36 that capture video of their patrons. Public squares, bus and train stations, and libraries also have security cameras 36 that capture video or still images of citizens. Even homes and cars have security cameras 36 that capture images of their environments. The image data 38 may be associated to a unique camera identifier 140 of the camera 36. The image data 38 may further use common terms, definitions, and value ranges from the application programming interfaces 114. Whatever the source of the image data 38, the aggregation server 20 may index the image data 38 to the corresponding user identifier 102 and to the camera identifier 140 in the database 70 of users.

Video monitoring will increase. As security needs increase, more video cameras 36 are being deployed. As we go about our daily lives, vast quantities of the image data 38 are thus being generated about each and every person. Once the image data 38 is indexed to the user, exemplary embodiments use the image data 38 to drive significant gains in self□tracking and context computing. As users are captured on video (including any corresponding audio data), users may manage how that image data 38 is shared by the aggregation server 20.

The image data 38 may also be tagged with the location 34. As the security camera 36 captures and/or streams its image data 38, the image data 38 may be tagged or associated with the corresponding geographical/GPS location 34 of the camera 36. The aggregation server 20 may thus allow the user to query the database 70 of users for any location 34 and retrieve the corresponding personal data 22, including the image data 38 from the same location 34. The user may thus view the image data 38 and approve or deny sharing. The user, for example, may permit sharing of security videos from grocery stores and department stores. For whatever reason, though, the user may not want to reveal security videos from particular locations, such any HOME DEPOT® and her corner gas station. Because the image data 38 may be associated with its location 34, exemplary embodiments permit the user to specify exactly those physical, geographical locations 34 from which her image data 38 may be shared.

Some security cameras 36 may be excluded. Even though there may be many security cameras 36 capturing the user's daily movements, the user may again choose which of those security cameras 36 is used for transparent sharing with third parties. Some cameras 36 may be stricken from use, such as the image data 38 from user's home security system. While the user may not mind revealing her menu selections, she may prefer to exclude actual video data, of her eating. She may further exclude the image data 38 captured or time-stamped during particular times. Exemplary embodiments thus permit complete configuration of how, and when, her image data 38 is shared with third parties.

FIG. 10 further illustrates the facial recognition 52. As all the security cameras 36 generate vast quantities of the image data 38, the facial recognition 52 may be used to identify the people in the images. The server-side algorithm 82, then, may interface with a separate or integral facial recognition system 150 to determine what users are present in the image data 38. As the reader may know, the facial recognition 52 is often computationally complex. The aggregation server 20 may rely on the facial recognition system 150 to identify the users. The facial recognition system 150 may merely notify the aggregation server 20 of the users (e.g., their user identifiers 102) present in the image data 38. The aggregation server 20 may thus index the user identifier 102 to the corresponding location 34 from which the image data 38 was captured. Moreover, as the facial recognition 52 was used, a time 152 of recognition may also be recorded and indexed. The server-side algorithm 82, for example, may index an offset and duration at which the user was identified in the image data 38. The server-side algorithm 82 is thus not burdened by complex processing that may be better performed by dedicated equipment. As many facial recognition techniques are known, no detailed explanation is necessary.

A facial profile 154 may be helpful. Participating users will want their face quickly and accurately recognized to ensure they receive the compensation 62 for each use of their image data 38. Each participating user, then, may submit to an accurate facial profile 154 of their human face. The facial profile 154 may store coordinates of facial features, hair and eye colors, and other data that allows quick identification.

Figure 11:
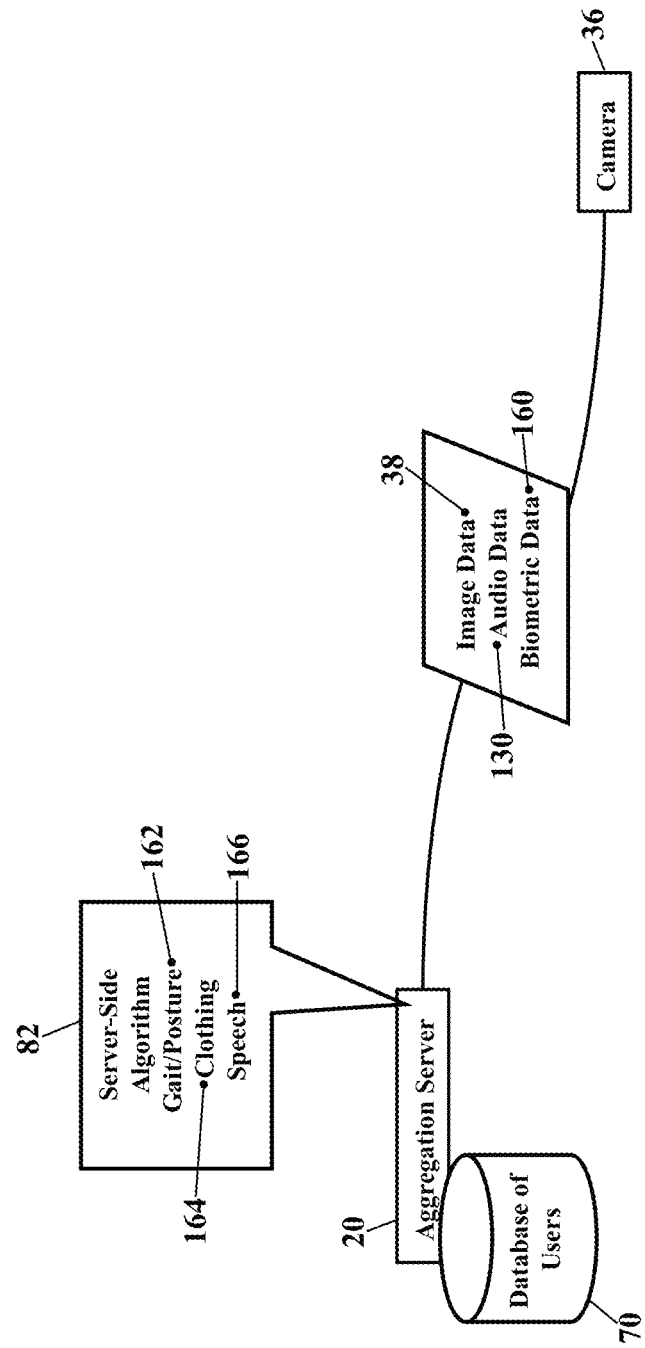
FIG. 11 is a diagram illustrating more indexing schemes, according to exemplary embodiments.

FIG. 11 is a diagram illustrating more indexing schemes, according to exemplary embodiments. As the image data 38 and/or the audio data 130 are is analyzed, exemplary embodiments may use any other techniques to identify individuals. Some of the image data 38 may be tagged or contemporaneously associated with unique biometric data 160 (perhaps captured during a purchase authentication or other financial transaction). Fingerprints and retina images, for example, are increasingly secure means of identifying individuals. Gait and posture 162, clothing 164, and speech 166 may all be profiled to identify individual users. Whatever the data 22, exemplary embodiments match the data 22 with one or more of the users in the database 70 of users.

Figure 12:
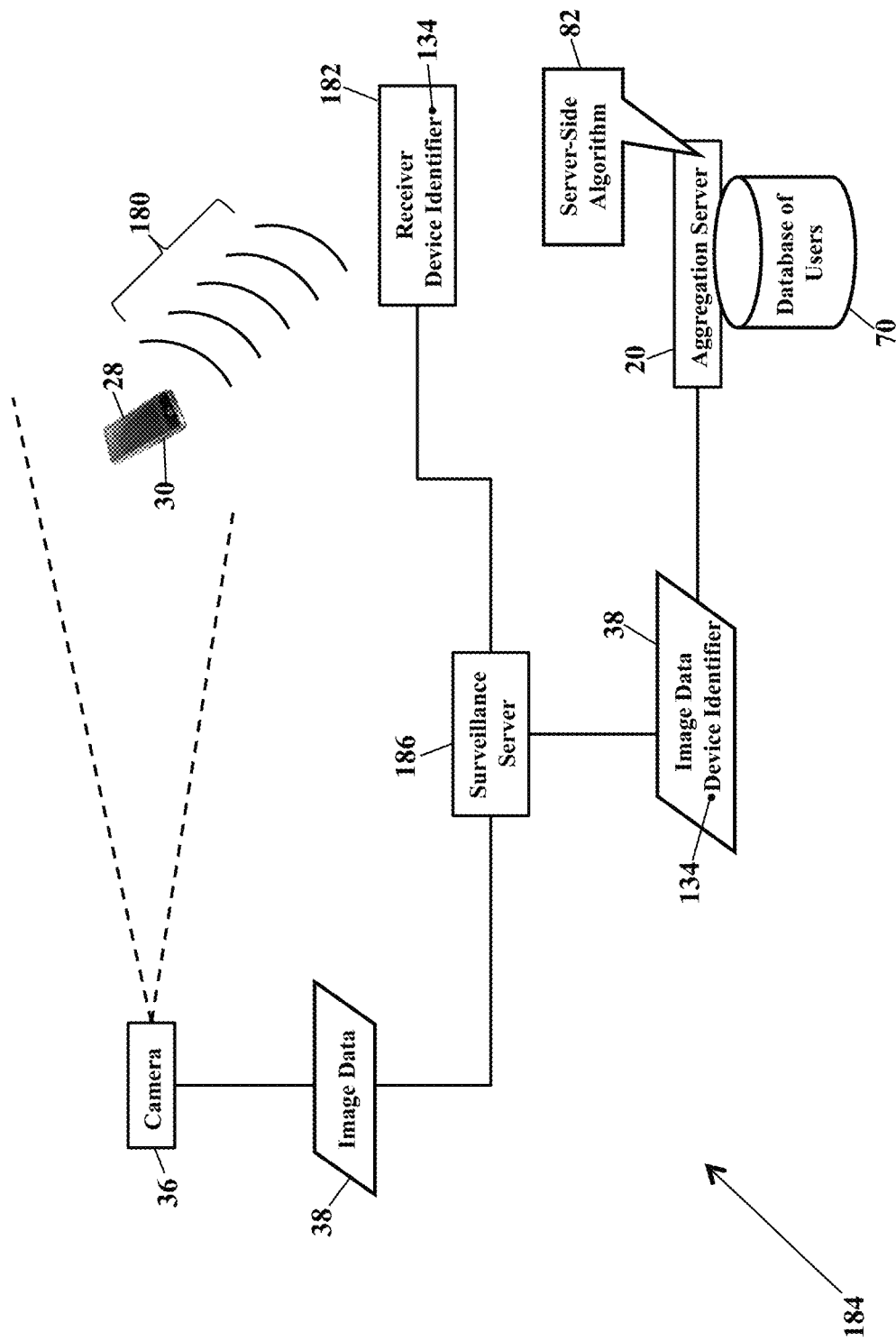
FIGS. 12-15 are diagrams illustrating beacon signaling, according to exemplary embodiments.

FIGS. 12-15 are diagrams illustrating beacon signaling, according to exemplary embodiments. Here the user's mobile device 28 (such as her smartphone 30) may help identify the user within the image data 38. FIG. 12, for example, illustrates a beacon signal 180 that is broadcast from the user's smartphone 30. As the user carries her smartphone 30, a transceiver in the smartphone 30 may periodically or randomly transmit the beacon signal 180. The beacon signal 180 is received by a receiver 182 of a surveillance system 184. The receiver 182 interfaces with a surveillance server 186 that is informed of the receipt of the beacon signal 180. If the beacon signal 180 includes the device identifier 134 of the user's smartphone 30, then the surveillance server 40 may tag or associate the contemporaneous image data 38 from the security camera 36 with the device identifier 134. When the aggregation server 20 is informed of the existence of the image data 38, the image data 38 is thus easily indexed to the device identifier 134 and/or the corresponding user identifier 102 in the database 70 of users.

The beacon signal 180 may have any frequency and content. The beacon signal 180 may be transmitted using any frequency in the electromagnetic spectrum. Radio frequencies, however, may be preferred, as the user's smartphone 30 may already have a radio frequency transceiver. The beacon signal 180 may be analog or digital, although digital may be preferred for security. The beacon signal 180 may further include or convey additional content, such the operational mode and context of the user's smartphone 30 at the time.

Figure 13:
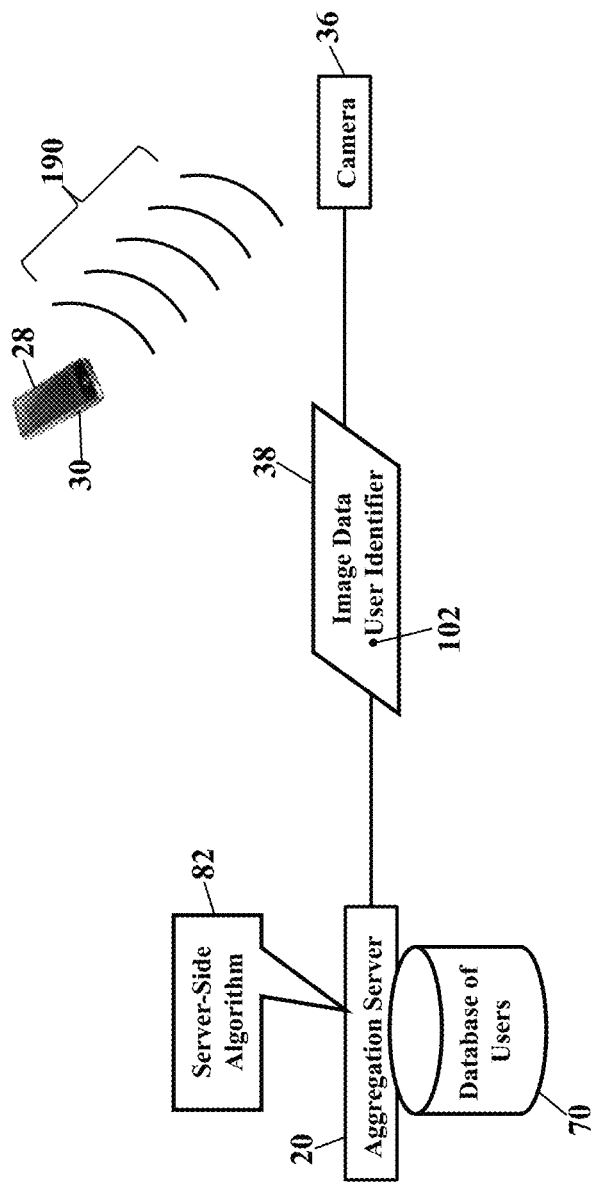

FIG. 13 illustrates an infrared beacon signal 190. Here the infrared beacon signal 190 is broadcast in the infrared portion of the electromagnetic spectrum. The infrared beacon signal 190 may thus be detected in the image data 38 generated by the security camera 36. The infrared beacon signal 190, for example, may flash the user identifier 102 of the user associated with the mobile device 28. The infrared beacon signal 190 may further identify its mobile device 28 (such as by flashing the device identifier 134, as illustrated in FIG. 12). Regardless, the video content in the image data 38 allows the aggregation server 20 to index the image data 38 to the device identifier 134 and/or the corresponding user identifier 102 in the database 70 of users.

Figure 14:
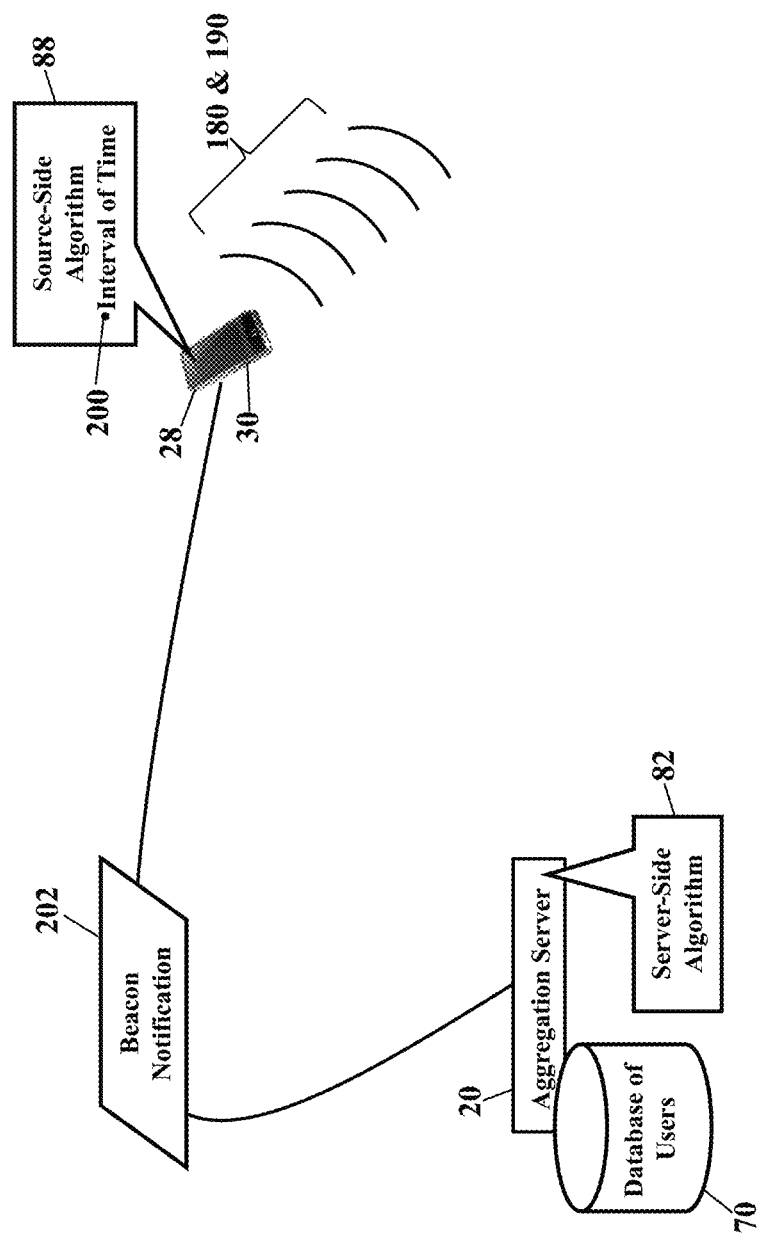
Figure 15:
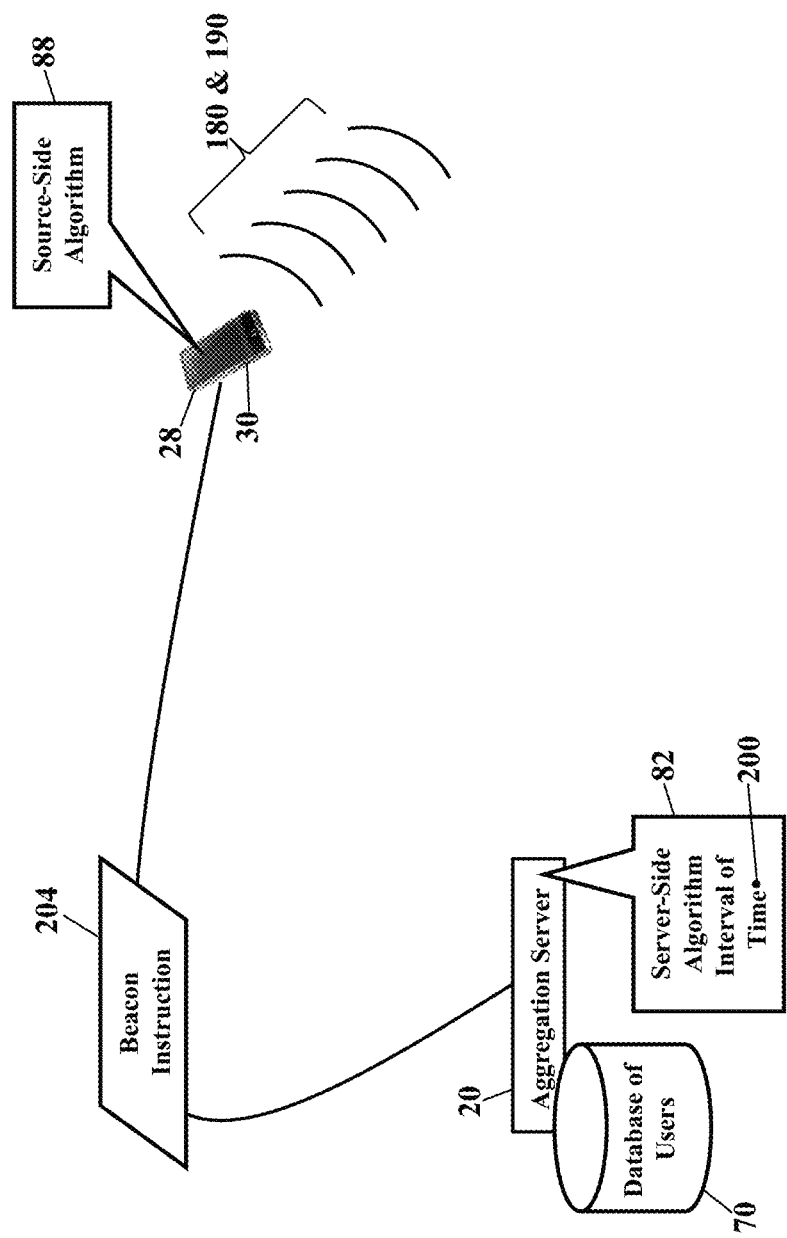

FIGS. 14-15 illustrate dynamic beacon signaling. Whatever the frequency of the beacon signal 180, exemplary embodiments may vary the beacon signal 180 to enhance security and preserve anonymity. The mobile device 28, for example, may change the broadcast frequency and/or informational content in random intervals 200 of time. As FIG. 14 illustrates, the source-side algorithm 88 may instruct the user's mobile device 28 to randomly change the beacon signal 180 or the infrared beacon signal 190. The source-side algorithm 88 may also instruct the user's mobile device 28 to send a beacon notification 202 to the network address of the aggregation server 20. The beacon notification 202 thus informs the aggregation server 20 of the random change to the beacon signal 180 or the infrared beacon signal 190, thus still maintaining the association between the user's mobile device 28 and the image data 38. In FIG. 15, the aggregation server 20 may instruct or command the source-side algorithm 88 to randomly change the beacon signal 180 or the infrared beacon signal 190. The aggregation server 20, for example, sends a beacon instruction 204 to the user's mobile device 28. FIG. 15, for simplicity, illustrates the beacon instruction 204 originating from the aggregation server 20. The beacon instruction 204, though, may originate from any management device.

Figure 16:
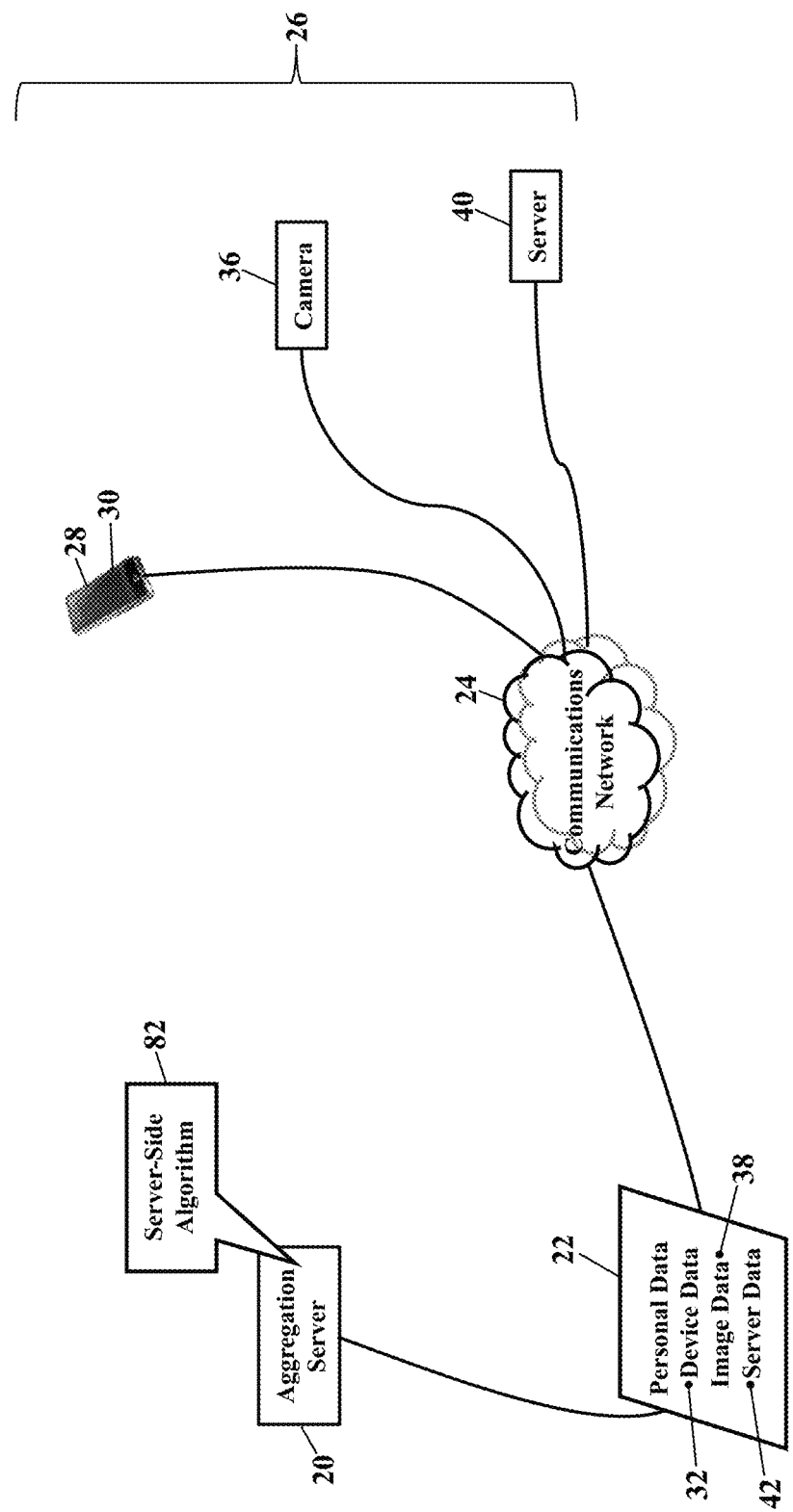
FIGS. 16-17 are diagrams illustrating different reporting schemes, according to exemplary embodiments.
Figure 17:
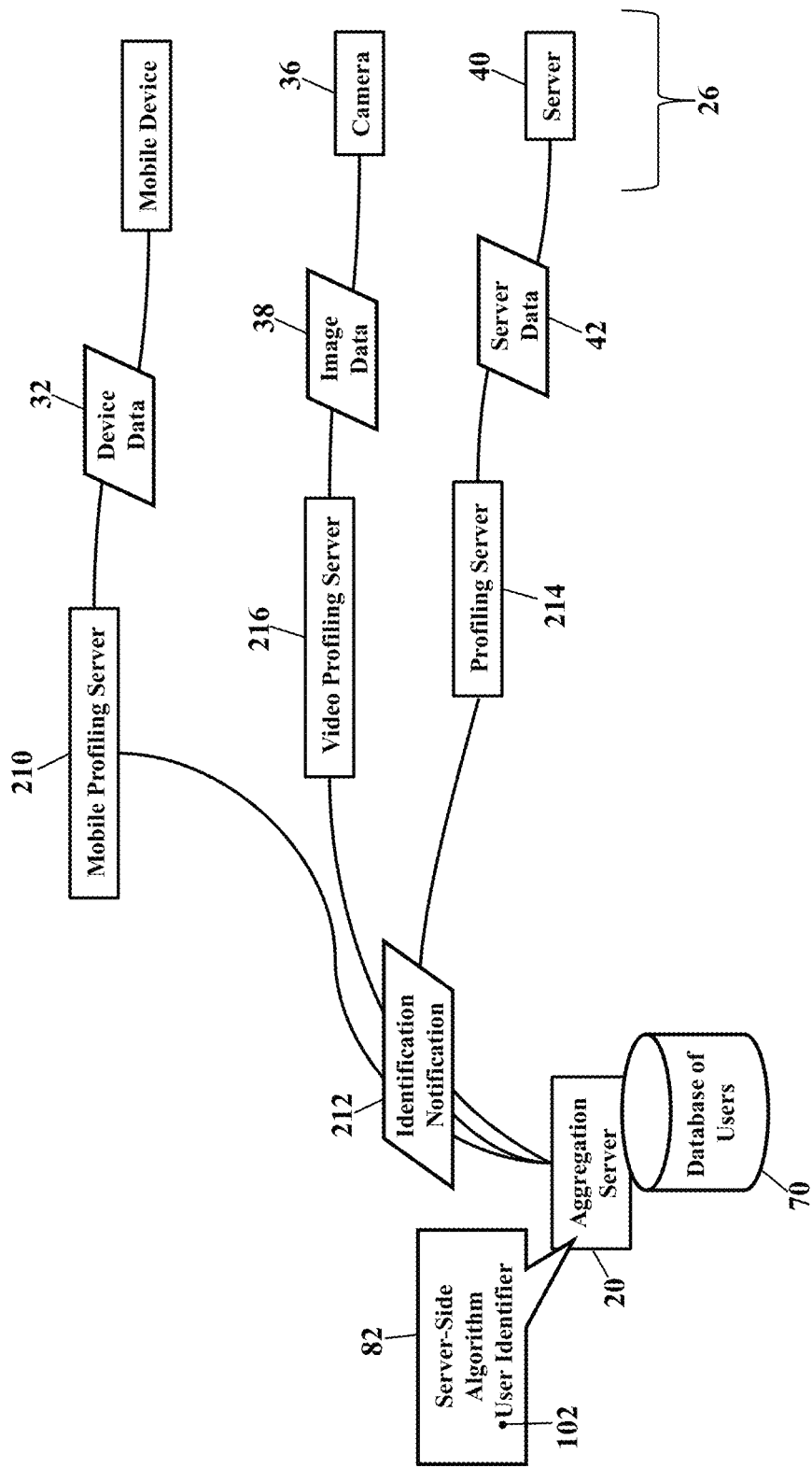

FIGS. 16-17 are diagrams illustrating different reporting schemes, according to exemplary embodiments. As earlier paragraphs explained, the source devices 26 generate their respective personal data 22. The user's mobile device 28, for example, generates its device data 32, the server 40 generates the server data 42, and the security camera 36 generates the image data 38. As FIG. 16 illustrates, any of this data 22 may be sent to the aggregation server 20 for analysis. The aggregation server 20, in other words may receive raw streaming data 22, and the aggregation server 20 manages the identification of the individual users. The aggregation server 20 may query supporting, back-end server systems (such as the facial recognition system 150 illustrated in FIG.

10). The aggregation server 20 may thus be a final destination for any of the personal data 22 captured by the source devices 26.

FIG. 17, though, illustrates a more distributed solution. Even though the source devices 26 generate their respective personal data 22, intermediary destinations may perform collection and processing tasks. All the device data 32, for example, may route to a mobile profiling server 210 that specializes in profiling of the device data 32. Whatever the mobile device 28 that generated the device data 32, the mobile profiling server 40 may specialize in profiling the device data 32 and in determining the user identifier 102. When the mobile profiling server 40 completes a determination of the user identifier 102, the mobile profiling server 40 sends an identification notification. 212 to the aggregation server 20. The identification notification. 212 informs the aggregation server 20 of the existence of the device data 32 and its associated user identifier 102. The aggregation server 20 may thus store an entry in the database 70 of users that indexes the device data 32 to the user identifier 102.

The server data 42 may also be separately processed. Whatever the source of the server data 42, the server data 42 may be sent to the network address of a dedicated profiling server 214. The profiling server 214 receives the server data 42, profiles the server data 42, and determines the user identifier 102. When the profiling server 214 completes the identification, the profiling server 214 sends the identification notification 212 to the aggregation server 20. The identification notification 212 informs the aggregation server 20 of the existence of the server data 42 and its associated user identifier 102. The aggregation server 20 may thus store an entry in the database 70 of users that indexes the server data 42 to the user identifier 102.

The image data 38 may also be separately processed. Any of the image data 38, captured by any security camera 36, may be sent to the network address of a dedicated video profiling server 216. The video profiling server 216 receives the image data 38 and performs any image recognition process to profile the image data 38. The video profiling server 216, for example, may call or execute the facial recognition system 150 (illustrated in FIG. 10) to determine the user(s), and thus the corresponding user identifier(s) 102, in the image data 38. Once any user has been identified, the video profiling server 216 sends the identification notification 212 to the aggregation server 20. The identification notification 212 informs the aggregation server 20 of the existence of the image data 38 and its associated user identifier 102. The aggregation server 20 may thus store an entry in the database 70 of users that indexes the image data 38 to the user identifier 102.

Figure 18:
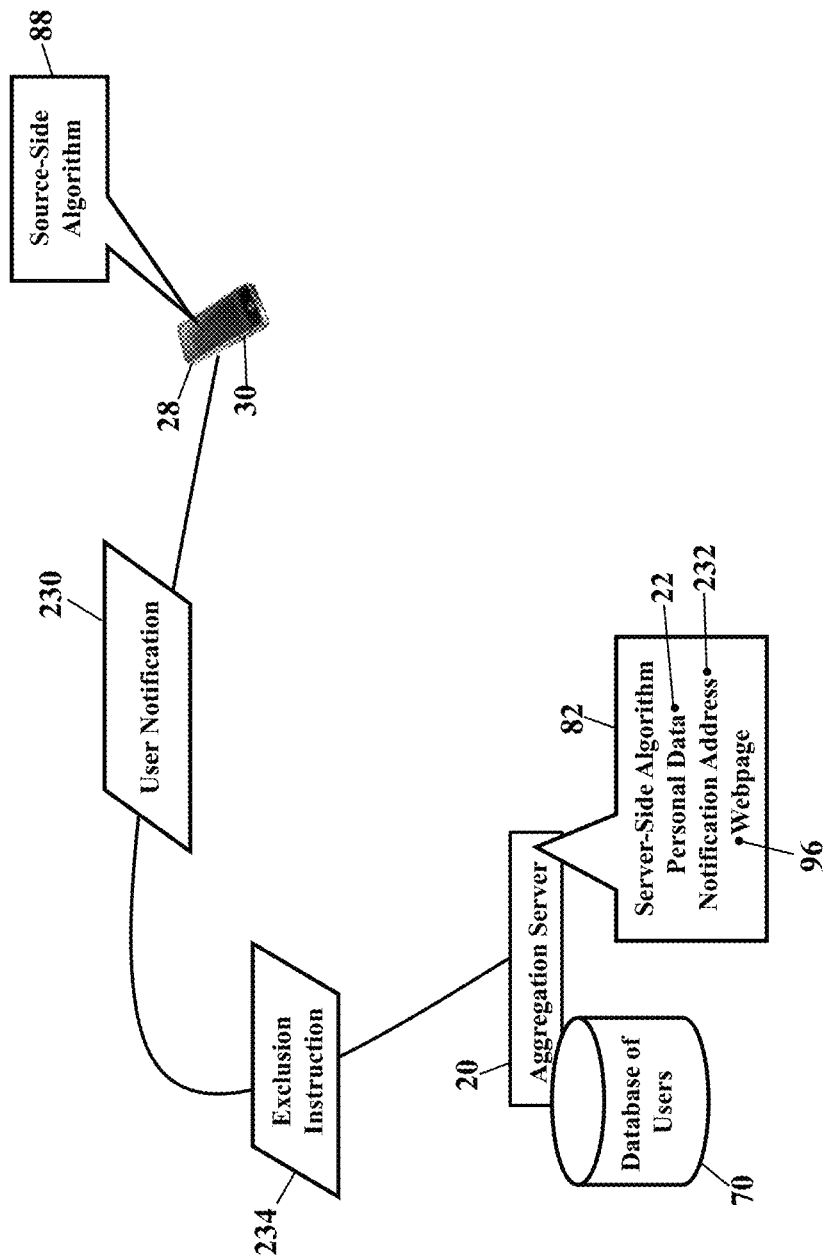
FIGS. 18-19 are diagrams illustrating user notifications, according to exemplary embodiments.
Figure 19:
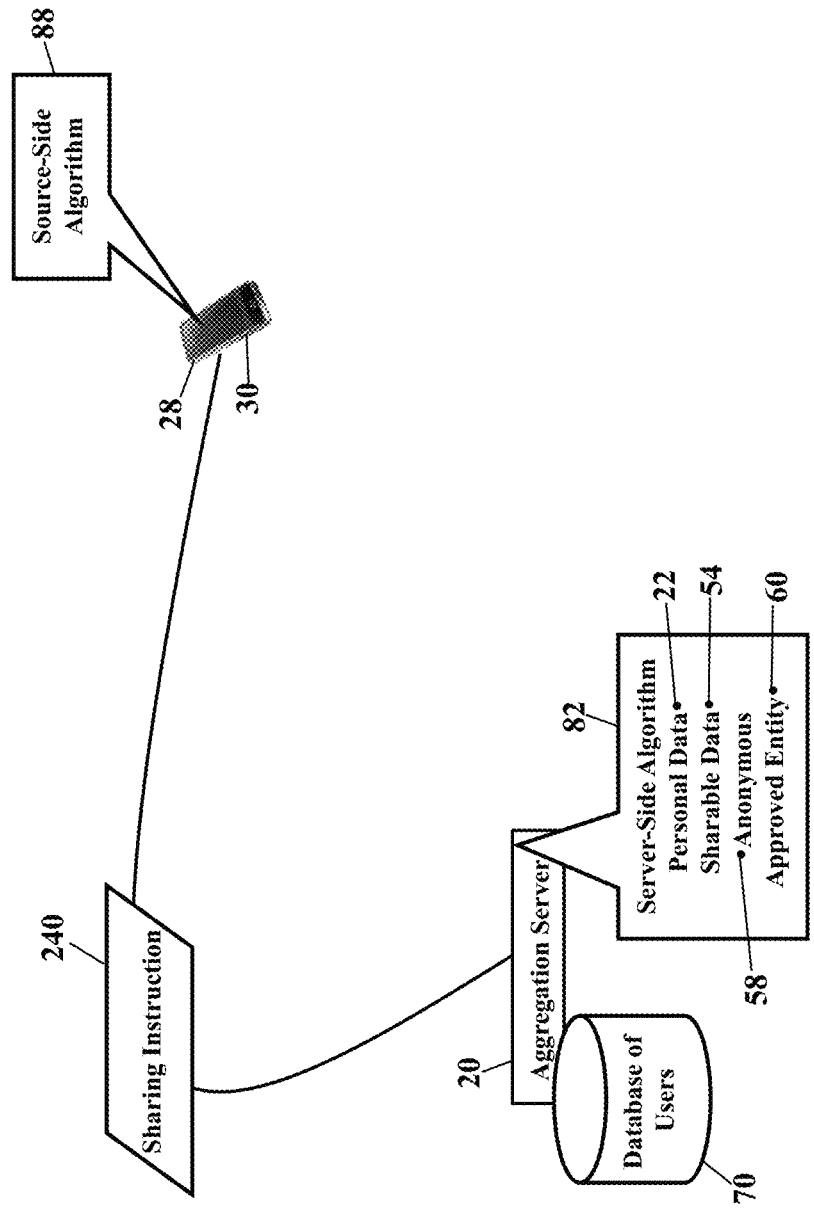

FIGS. 18-19 are diagrams illustrating user notifications, according to exemplary embodiments. The aggregation server 20 thus stores a complete, centralized database identifying all the personal data 22 collected about us. Any time the aggregation server 20 creates a new entry in the database 70 of users, the aggregation server 20 may notify the corresponding user. The server-side algorithm 82, for example, may send a user notification 230 to a notification address 232 associated with the user identifier 102. FIG. 18, for simplicity, illustrates the user notification 230 sent to the network address of the user's mobile smartphone 30. The user notification. 230 may include information that identifies the data 22 generated by the source device 26. The user notification 230 may instruct or invite the user, for example, to log on and download the personal webpage 96 describing or revealing the data 22. The aggregation server 20 thus provides an opportunity for the user to inspect the personal data 22 for sharing opportunities. If the personal data 22 is unsuited for sharing, then the user may exclude, or even delete, the data 22. The user, in other words, self-determines whether her own personal data 22 is available for profiling and sharing. The user may thus cause the source-side algorithm 88 to return send an exclusion instruction 234 that instructs the aggregation server 20 to exclude, or even delete, the corresponding personal data 22. The server-side algorithm 82 may then itself exclude or delete the data 22 from the database 70 of users, and/or the server-side algorithm 82 may forward the exclusion instruction 234 to any intermediary device that stores the data 22. The user's personal data 22, in short, may be deleted to prevent its further use.

As FIG. 19 illustrates, the user may permit sharing. After reviewing the data 22, the user may decide that she wishes to share the data 22. The source-side algorithm 88 may thus return send a sharing instruction 240 to the aggregation server 20. The sharing instruction 240 may approve the personal data 22 for sharing with her approved entities 60. The sharing instruction 240 may further include the option for rendering the sharable data 54 anonymous 58 prior to sharing. When the aggregation server 20 receives the sharing instruction 240, the server-side algorithm 82 may update the database 70 of users to associate the personal data 22 to the approved entities 60. The aggregation server 20, in short, is permitted to provide the sharable data 54 to any of the approved entities 60.

The user thus has access control over her sharable data 54. The user may enable, or disable, access to all or any part of her data 22. She may explicitly identify her approved entities 60 that have access permissions to her sharable data 54. Her approved entities 60 may include individuals and/or groups. She may authorize access to her raw data 22. If the aggregation server 20 performs any analysis of her raw data 22 and/or her sharable data 54, the user may enable or disable any analysis or context. She may also enable or disable access based on her user context or other situational data. The user may also enable or disable access to any historical or recent/current data 22.

Exemplary embodiments may also thwart rogue access. As participation third parties may attempts malicious or unauthorized access to the database 70 of users. Exemplary embodiments may thus circumvent access by unauthorized third parties (perhaps by coordinating with other third parties) by giving each different source device 26 a different index number. Aggregation may thus exclude any data 22 from an unrecognized or unauthorized source device 26. The index numbers may also change with time to make coordination more difficult.

Figure 20:
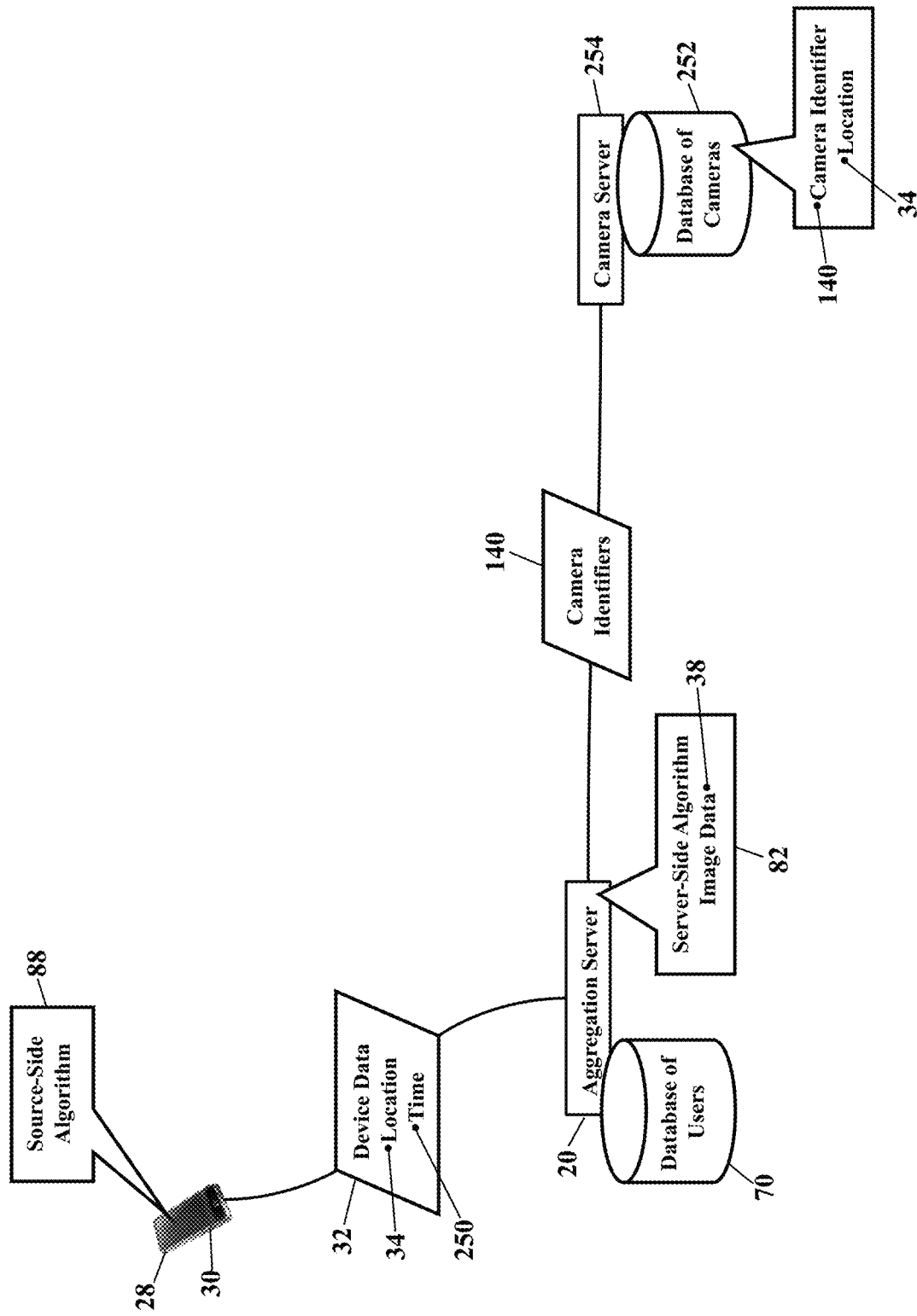
FIGS. 20-21 are diagrams illustrating yet another notification scheme, according to exemplary embodiments.
Figure 21:
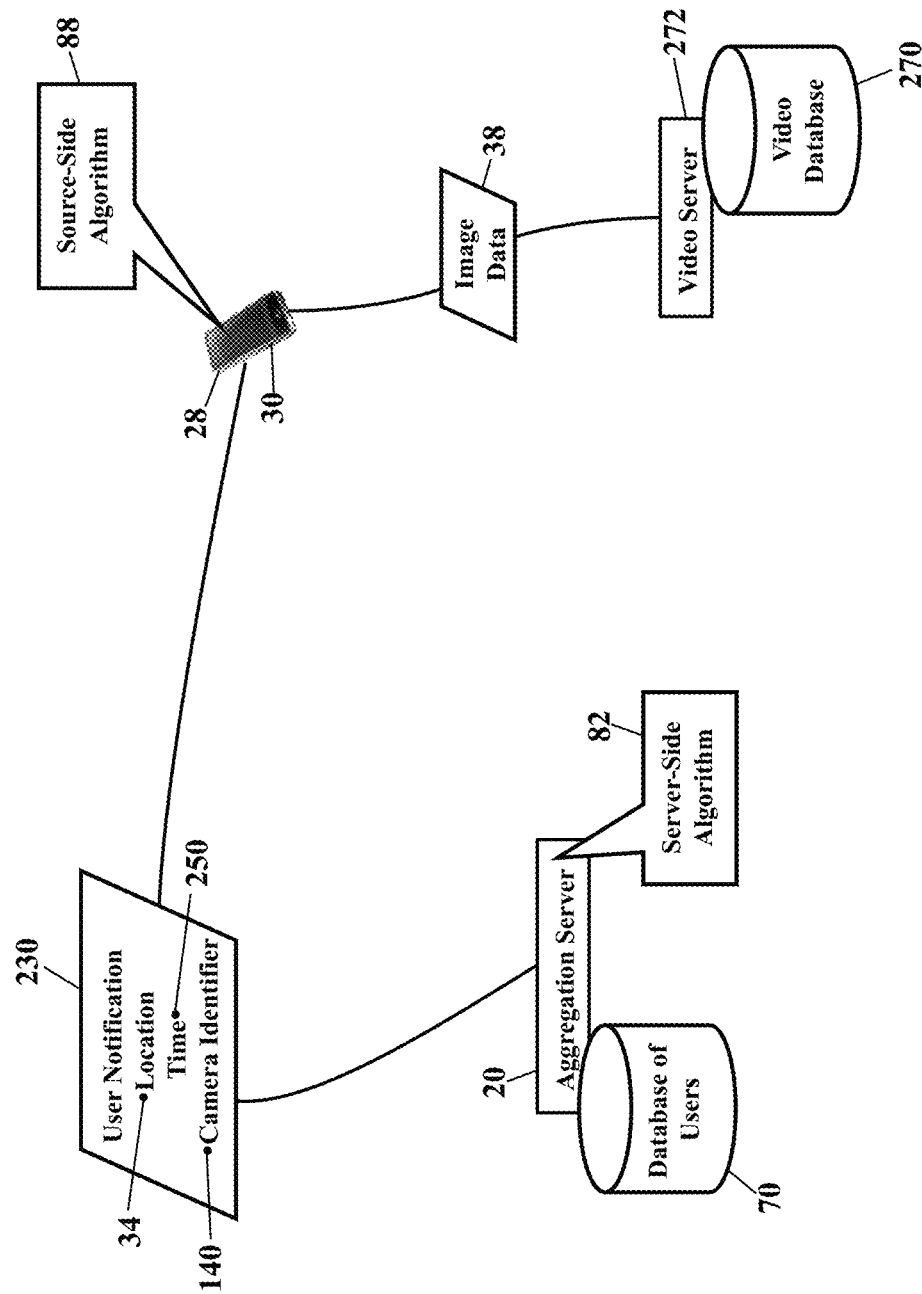

FIGS. 20-21 are diagrams illustrating yet another notification scheme, according to exemplary embodiments. Here the aggregation server 20 may notify the user when she may be captured in image data 38 captured by any security camera 36. The user's mobile device 28, as earlier explained, may generate its location 34 and corresponding time 250 (perhaps using GPS information, as is known). Whenever the aggregation server 20 receives the location 34 and time 250 associated with the user's mobile device 28, the aggregation server 20 may consult a database 252 of cameras. The database 252 of cameras is a central database of locations of security cameras. FIG. 20 illustrates the database 252 of cameras as being remotely stored and accessed from a specialized camera, server 254. The database 252 of cameras stores associations between the different security cameras 36 and their corresponding physical locations 34. Whenever the aggregation server 20 receives any location 34 and time 250 associated with the user's mobile device 28, the aggregation server 20 may query the camera server 40 for the location 34 and/or the time 250. The camera server 40 may thus store and execute a query handler that retrieves the camera identifiers 140 of any security cameras 36 matching the location 34 of the user's mobile device 28. When the aggregation server 20 receives the camera identifiers 140 in response, the server-side algorithm 82 thus knows that the user's mobile device 28 may have been captured in the image data 38 generated by any of the security cameras 36 having the corresponding camera identifiers 140.

As FIG. 21 illustrates, the aggregation server 20 may then send the user notification 230. Here, though, the user notification 230 informs the user that she may have been captured in the image data 34 at the location 34 and time 250 reported by her smartphone 30. The user may then instruct her smartphone 30 to send a query to the network address of a video database 270 (maintained by a video server 272) storing the image data 38 captured by the security camera 36 having the corresponding camera identifier 140. The user notification 230 may even include a webpage link for ease of retrieval. The user's smartphone 30 may thus retrieve and display the image data 38 at the reported time 250. If the user confirms her image, she may then decide whether the image data 38 is accessible and/or sharable to/by the aggregation server 20 (as the above paragraphs explained). If her image is not present, she may decline to share the image data 38. The database 252 of cameras thus provides a simpler solution that need not rely on facial recognition and beacon signals. The database 252 of cameras, however, does require added effort by the user, but many users will welcome inspection and confirmation of video security.

Figure 22:
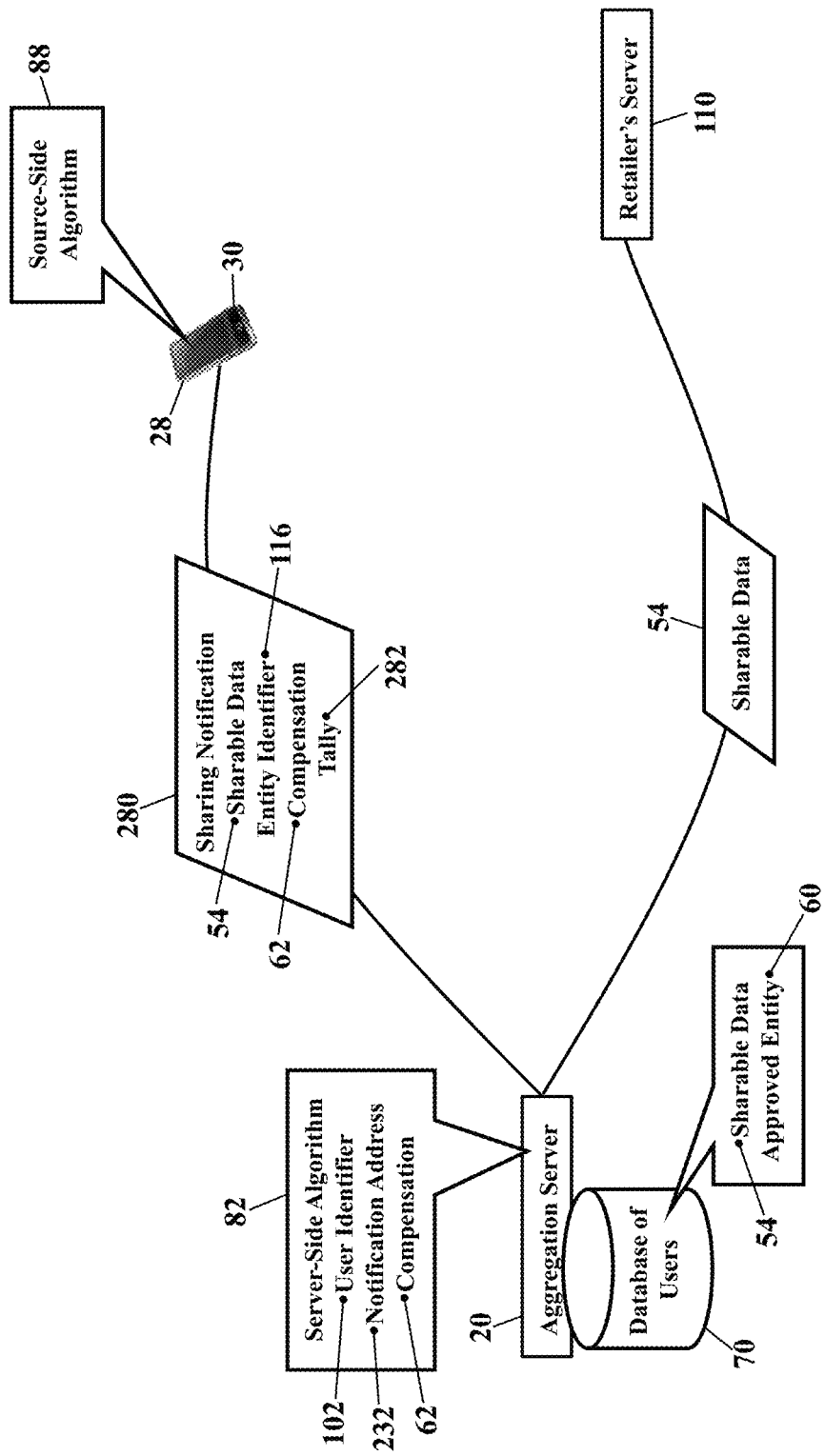
FIG. 22 is a diagram illustrating a sharing notification, according to exemplary embodiments.

FIG. 22 is a diagram illustrating a sharing notification 280, according to exemplary embodiments. Here, whenever the user's sharable data 54 is accessed by one of her approved entities 60 (such as the retailer's server 110), the aggregation server 20 may send the sharing notification 280 to the notification address 232 associated with the user identifier 102. The sharing notification 280 may further identify which of her sharable data 54 was shared with the entity identifier 116. The sharing notification 280 may even include a description of the compensation 62 she will receive for exchanging her sharable data 54. The sharing notification 280 may further a monthly or yearly tally 282 of her compensation 62 to date, thus reminding her of the benefit for continued participation. The actual compensation 62 may then be processed as an immediate micro-payment, or a monthly macro-payment, to her credit card, loyalty card, or other account.

The revenue model may have many sources. Access to the database 70 of users may be the primary source of revenue. Exemplary embodiments, in other words, may charge marketers, merchants, online/offline service companies, and any other entity for access to the user's sharable data 54. Query payments, for example, may be based on whether anonymous or user-specific sharable data 54 is requested. Some types of the sharable data 54 may be more valuable or meaningful than others. Some sources devices 26 may be more valuable or meaningful than others. Query payments may also be based on whether user context or situational data is requested. Users may be charged a fee for enrollment and establishment of their profile. Subscription fees may also be charged. Indeed, as adoption grows, the contributors of the personal data 22 (such as the businesses operating the security cameras 36) may pay for participation.

The sharing notification 280 may be tailored to the user. As a simple example, the sharing notification 280 may be sent when the user's mobile device 28 enters a retail store (detection by location or by network connection). The sharing notification 280 may include a description of the sharable data 54 that was retrieved by the retailer. The sharing notification 280 may first, though, include a prompt to approve release of, or access to, the user's sharable data 54. This prompt for permission, prior to access, may endear the user to the retailer. Even if the user were to decline or deny permission, her opinion of the retailer is likely boosted. Customer satisfaction increases, even if the user fails to reciprocate. The sharing notification 280 thus drives increased traffic, both as physical feet and as online visits.

Exemplary embodiments may also distribute analysis of the user's sharable data 54. Once the user approves access to her sharable data 54, exemplary embodiments may simply provide the user's sharable data 54 to the third party. That is, exemplary embodiments may only identify the user in the database 70 of users. Once the user's sharable data 54 is identified, the raw, sharable data 54 may simply be passed to the approved entity 60 for profiling and any other analysis. Indeed, once the third party is partnered and trusted, the user's sharable data 54 is theirs to improve the user's products and services.

The database 70 of users thus reflects real-time acquisition. The database 70 of users may be immediately updated to reflect the user's travels and usage. Indeed, the database 70 of users may be updated with any personal data 22 from any entities, as well as subscribed services, any user devices, and manually entered data, regardless of the source device 26. The more comprehensive the personal data 22, the more accurate the benefit will be to the participating parties. Contextual profiling and settings are improved, as well as refining self-tracking models to optimize performance and/ or change behavior. These real time, contextual-computing profiles may be made available to any systems that might benefit the user (such as the user's residential gateway server or the user's vehicle's telematics system). Moreover, as the location 34 of the user's mobile device 28 may be tracked, exemplary embodiments may follow the user as she travels. Different department stores, for example, may use her location 34 to continually refine her experience. When friends are visited, their home network may be instructed to adopt personalization unique to the visitor.

Exemplary embodiments may thus describe a cloud-based system and service. The source devices 26 may upload their respective personal data 22 for analysis and identification. Intermediary systems and processes, though, may perform some initial analysis on the raw streaming data 22 to determine the individual user identifiers 102. The aggregation server 20 may thus only be a destination for the identification notifications 212. Regardless, when identification is successful, users may retrieve and inspect their personal data 22 prior to sharing with third parties.

Exemplary embodiments thus provide a manageable solution for data collection. The scale and scope of all the personal data 22 being collected is incredible. Our communications and Internet traffic are being monitored. Purchasing transactions and video data reveal what we eat, when we eat it, and even the foods we do not eat. Purchasing transactions and video data also reveal the items we inspect in stores, what clothes we buy, and the people we admire. All the personal data 22 collected from all the source devices 26 may be used to better understand ourselves. Indeed, if we permit, exemplary embodiments enable our chosen third party partners to use our sharable data 54 to provide us better produces and services.

Exemplary embodiments may be applied to any type of the image data 38. Consider, for example, the security cameras 36 in health clubs, exercise rooms, and health facilities. As the image data 38 is analyzed to identify different users, the user's physical and emotional conditions may also be analyzed. The image data 38, for example, may reveal heart rates, perspiration, attitude, demeanor, and language. Recommendations may be made for health, wellness, and even security.

Exemplary embodiments thus capture any personal data 22 from any sensory source device 26. The data 22 may be anonymous or semi-anonymous. Individual users may thus access significant amounts of their valuable personal data 22, which they can then incorporate into context computing and self-tracking efforts. Exemplary embodiments provide a transparent profiling solution that improves relations and builds trust. The individual's preference for one entity over another might be swayed by an entity's transparent participation.

Exemplary embodiments may include residential data. Growing trends in home monitoring and automation enable data sharing across homes. Exemplary embodiments may thus transfer personal profiles between different homes, thus making people feel more at home when they visit friends or stay at hotels. Exemplary embodiments thus help determine how comfortable people are in different environments and under different circumstances.

Figure 23:
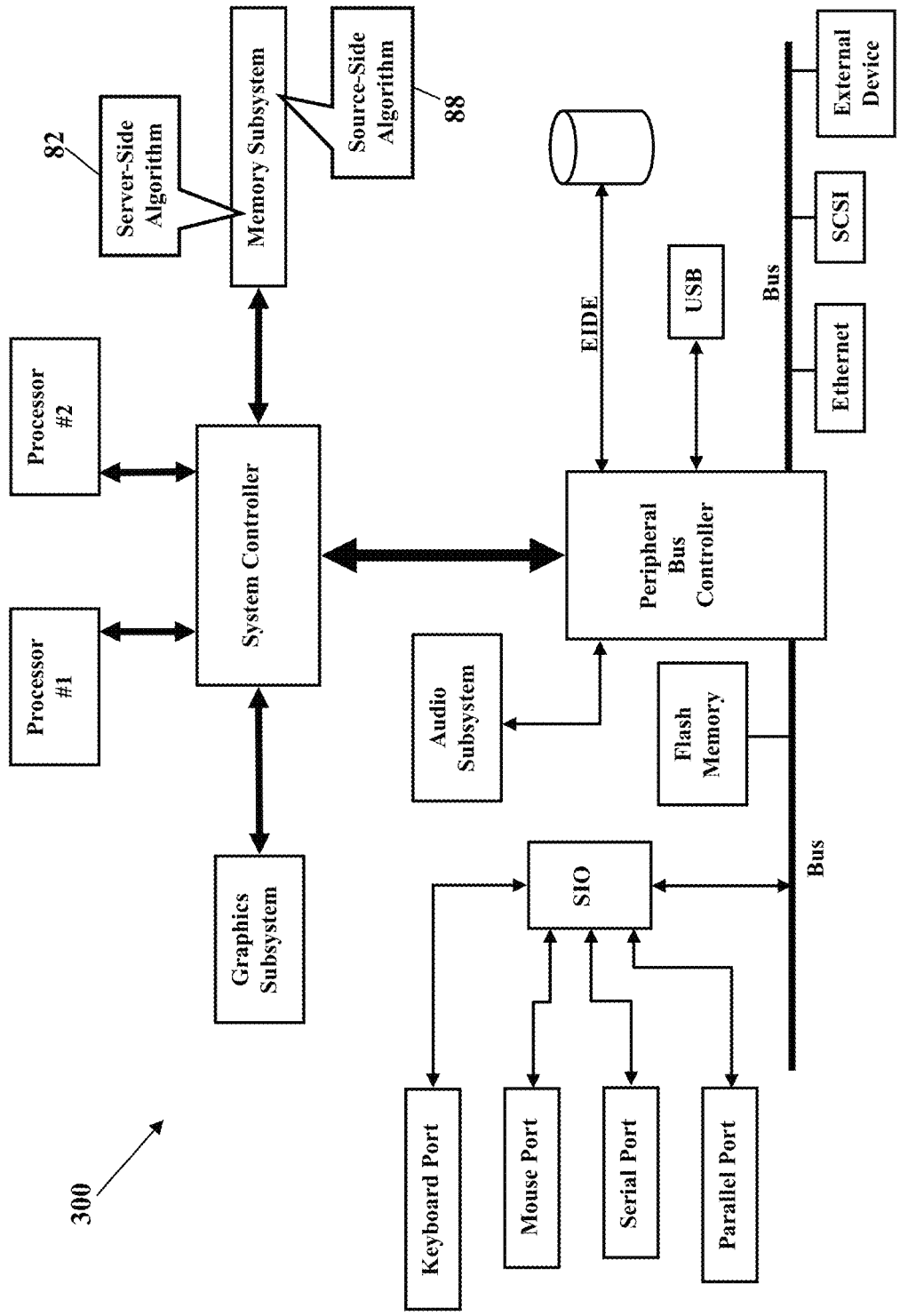
FIGS. 23-24 depict still more operating environments for additional aspects of the exemplary embodiments.

FIG. 23 is a schematic illustrating still more exemplary embodiments. FIG. 23 is a more detailed diagram illustrating a processor-controlled device 300. As earlier paragraphs explained, exemplary embodiments may be applied to any operating environment. Exemplary embodiments, for example, may be practiced at small and more location dependent scales, such as cellular base stations, WI-FI® network devices, and device-to-device exchanges. The server-side algorithm 82 and the source-side algorithm 88, then, may operate in any processor-controlled device. FIG. 23, then, illustrates the server-side algorithm 82 and the source-side algorithm 88 stored in a memory subsystem of the processor-controlled device 300. One or more processors communicate with the memory subsystem and execute either, some, or all applications. Because the processor-controlled device 300 is well known to those of ordinary skill in the art, no further explanation is needed.

Figure 24:
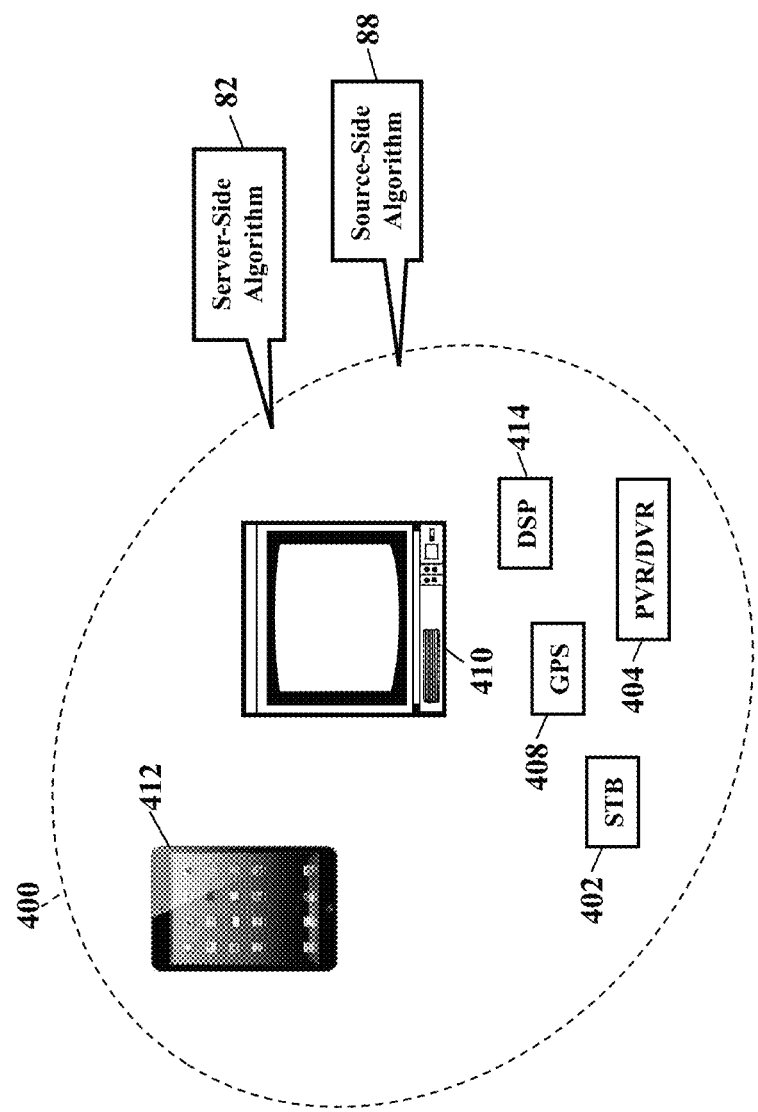

FIG. 24 depicts other possible operating environments for additional aspects of the exemplary embodiments. FIG. 24 illustrates the server-side algorithm 82 and the source-side algorithm 88 operating within various other devices 400. FIG. 24, for example, illustrates that the server-side algorithm 82 and the source-side algorithm 88 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing the processor 50 and/or a digital signal processor (DP/DSP) 414. The device 400 may also include network switches, routers, modems, watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers licensees, and assignees. A computer program product comprises processor-executable instructions for transparent collection of personal data, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
receiving, by an aggregation server comprising a processor, via a communication network, data relating to a user that is generated from a plurality of sources, wherein the data comprises image data from a digital camera, location data from a mobile device, and on-line data from a network server;
identifying, by the aggregation server using facial recognition, an image of the user captured in the image data;
storing, by the aggregation server in a network database, personal data of different users including the user received from the plurality of sources over the communication network;
associating, by the aggregation server, in the network database, a portion of the data that includes the image of the user to the personal data associated with the user based on matching the image of the user with a profile of the user;
restricting access to the portion of the data associated with the profile of the user;
sending, by the aggregation server via the communication network, a notification to a device associated with the user based on identifying the image of the user, wherein the notification informs the user of the image of the user captured in the data;
receiving, by the aggregation server, a sharing permission from the user to share the portion of the data that includes the image of the user with an approved entity, and
sharing, by the aggregation server, the portion of the data that includes the image of the user with the approved entity.

2. The method of claim 1, further comprising:
associating, by the aggregation server, the image data to a beacon signal that uniquely identifies a mobile device carried by the user.

3. The method of claim 1, further comprising:
identifying, by the aggregation server, an infrared beacon signal in the image data, wherein the infrared beacon signal uniquely identifies the user.

4. The method of claim 1, further comprising:
receiving, by the aggregation server, a query from the approved entity requesting access to the portion of the data that includes the image of the user.

5. The method of claim 4, further comprising:
sending, by the aggregation server via the communication network, a sharing notification to the device associated with the user in response to the query, wherein the sharing notification informs the user of the portion of the data that includes the image of the user being shared with the approved entity.

6. The method of claim 1, further comprising:
querying, by the aggregation server, the network database for a location specified by the user to obtain personal data of the user associated with the location.

7. The method of claim 6, further comprising:
generating, by the aggregation server, a summary report of the personal data associated with the location specified by the user.

8. A system, comprising:
a processor; and
memory storing instructions that when executed cause the processor to perform operations, the operations including
receiving, via a communication network, data relating to a user that is generated from a plurality of sources, wherein the data comprises image data from a digital camera, location data from a mobile device, and on-line data from a network server;
identifying, using facial recognition, an image of the user captured in the image data;
storing, in a network database, personal data associated with the different users including the user received from the plurality of sources over the communication network;
associating, in the network database, a portion of the data that includes the image of the user to the personal data associated with the user based on matching the image of the user with a profile of the user;
restricting access to the portion of the data associated with the profile of the user;
sending, via the communication network, a notification to a device associated with the user based on identifying the image of the user, wherein the notification informs the user of the image of the user captured in the data;
receiving a sharing permission from the user to share the portion of the data that includes the image of the user with an approved entity, and
sharing the portion of the data that includes the image of the user with the approved entity.

9. The system of claim 8,
wherein the operations further comprise associating the image data to a beacon signal that uniquely identifies a mobile device carried by the user.

10. The system of claim 8,
wherein the operations further comprise identifying an infrared beacon signal in the image data, and the infrared beacon signal uniquely identifies the user.

11. The system of claim 8,
wherein the operations further comprise receiving a query from the approved entity requesting access to the portion of the data that includes the image of the user.

12. The system of claim 11,
wherein the operations further comprise sending, via the communication network, a sharing notification to the device associated with the user in response to the query, wherein the sharing notification informs the user of the portion of the data that includes the image of the user being shared with the approved entity.

13. The system of claim 8,
wherein the operations further comprise querying the network database for a location specified by the user to obtain personal data of the user associated with the location.

14. The system of claim 13,
wherein the operations further comprise generating a summary report of the personal data associated with the location specified by the user.

15. A non-transitory machine readable medium, comprising executable instructions that, when executed by a processor, facilitate performance of operations, the operations comprising:
receiving, via a communication network, data relating to a user that is generated from a plurality of sources, wherein the data comprises image data from a digital camera, location data from a mobile device, and on-line data from a network server;
identifying, using facial recognition, an image of the user captured in the image data;
storing, in a network database, personal data associated with the different users including the user received from the plurality of sources over the communication network;
associating, in the network database, a portion of the data that includes the image of the user to the personal data associated with the user based on matching the image of the user with a profile of the user;
restricting access to the portion of the data associated with the profile of the user;
sending, via the communication network, a notification to a device associated with the user based on identifying the image of the user, wherein the notification informs the user of the image of the user captured in the data;
receiving a sharing permission from the user to share the portion of the data that includes the image of the user with an approved entity, and
sharing the portion of the data that includes the image of the user with the approved entity.

16. The non-transitory machine readable medium of claim 15, wherein the operations further comprise associating the image data to a beacon signal that uniquely identifies a mobile device carried by the user.

17. The non-transitory machine readable medium of claim 16, wherein the operations further comprise identifying an infrared beacon signal in the image data, and the infrared beacon signal uniquely identifies the user.

18. The non-transitory machine readable medium of claim 15, wherein the operations further comprise receiving a query from the approved entity requesting access to the portion of the data that includes the image of the user.

19. The non-transitory machine readable medium of claim 18, wherein the operations further comprise sending, via the communication network, a sharing notification to the device associated with the user in response to the query, wherein the sharing notification informs the user of the portion of the data that includes the image of the user being shared with the approved entity.

20. The non-transitory machine readable medium of claim 15, wherein the operations further comprise querying the network database for a location specified by the user to obtain personal data of the user associated with the location.

* * * * *